United States Patent
Rahman et al.

(10) Patent No.: US 11,387,991 B2
(45) Date of Patent: Jul. 12, 2022

(54) QUANTUM ENABLED HYBRID FIBER CABLE LOOP

(71) Applicant: AT&T Intellectual Property I, L.P., Atlanta, GA (US)

(72) Inventors: Moshiur Rahman, Marlboro, NJ (US); Robert D. Boudreau, Jr., North Wales, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 409 days.

(21) Appl. No.: 16/706,295

(22) Filed: Dec. 6, 2019

(65) Prior Publication Data

US 2021/0176055 A1 Jun. 10, 2021

(51) Int. Cl.
*H04L 9/08* (2006.01)
*G06N 10/00* (2022.01)

(52) U.S. Cl.
CPC .......... *H04L 9/0855* (2013.01); *G06N 10/00* (2019.01); *H04L 9/0819* (2013.01)

(58) Field of Classification Search
CPC ...... H04L 9/0855; H04L 9/0819; G06N 10/00
See application file for complete search history.

(56) References Cited

U.S. PATENT DOCUMENTS

| | | | | |
|---|---|---|---|---|
| 10,348,493 | B2* | 7/2019 | Fu | ........................ H04L 9/0858 |
| 11,190,349 | B1* | 11/2021 | Vakili | ................... H04L 9/0869 |
| 2004/0032954 | A1 | 2/2004 | Bonfrate et al. | |
| 2008/0152147 | A1 | 6/2008 | Xia et al. | |
| 2012/0148237 | A1* | 6/2012 | Harrison | ................ B82Y 10/00 |
| | | | | 398/180 |
| 2012/0213371 | A1 | 8/2012 | Bush et al. | |
| 2014/0363174 | A1* | 12/2014 | Azuma | ................. H04L 9/0855 |
| | | | | 398/173 |
| 2018/0013556 | A1 | 1/2018 | Saavedra | |
| 2018/0241553 | A1 | 8/2018 | Lucamarini et al. | |
| 2019/0260581 | A1 | 8/2019 | Su et al. | |

(Continued)

OTHER PUBLICATIONS

Liao, Sheng-Kai et al., "Satellite-Relayed Intercontinental Quantum Network", Jan. 19, 2018, 10 pages.

(Continued)

*Primary Examiner* — Joseph P Hirl
*Assistant Examiner* — Stephen T Gundry
(74) *Attorney, Agent, or Firm* — Guntin & Gust, PLC; Ralph Trementozzi

(57) ABSTRACT

Aspects of the subject disclosure may include, for example, determining that quantum entanglement be established between first and second nodes of a service provider network including a software defined network (SDN) that facilitates delivery of a service to a subscriber and identifying a path between the first node and the second node based on pre-provisioned information supplied by the SDN. A path length of the path is estimated based on the pre-provisioned information supplied by the SDN, and a repeater node is selected responsive to the path length exceeding a threshold, wherein the path includes a first segment having a segment length that does not exceed the threshold. A quantum entanglement state is shared between the first and second nodes based on transportation of a first photon of a first entangled pair of photons via the first segment. Other embodiments are disclosed.

20 Claims, 14 Drawing Sheets

(56) References Cited

U.S. PATENT DOCUMENTS

| | | | | |
|---|---|---|---|---|
| 2019/0379463 | A1* | 12/2019 | Shields | H04L 9/0852 |
| 2020/0382219 | A1* | 12/2020 | Innes | H04B 10/70 |
| 2020/0412444 | A1* | 12/2020 | Jiang | H04B 10/70 |
| 2021/0105135 | A1* | 4/2021 | Figueroa | H04L 9/0858 |
| 2021/0159987 | A1* | 5/2021 | Zhang | H04B 10/70 |
| 2021/0385079 | A1* | 12/2021 | Curty Alonso | H04L 9/0838 |

OTHER PUBLICATIONS

Pan, Jianwei, "Progress of the Quantum Experiment Science Satellite (Quess) "Micius" Project", Space Science Activities in China; National Report 2016-2018, 2018, 6 pages.

Wikipedia, "Orbital Angular Momentum of Light", https://en.wikipedia.org/wiki/Orbital_angular_momentum_of_light, Nov. 26, 2018, 8 pages.

* cited by examiner

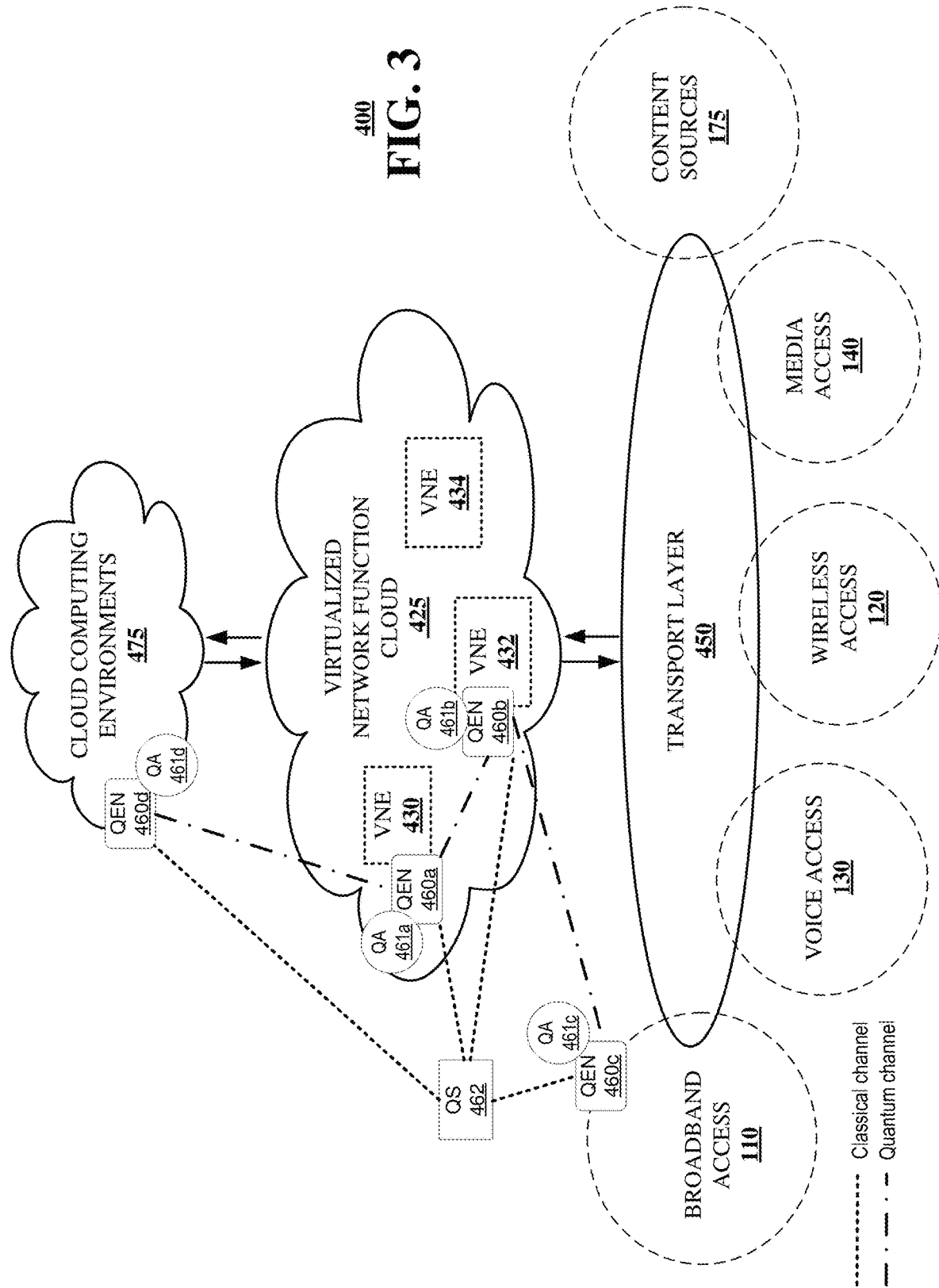

700

QUANTUM ENABLED HYBRID FIBER CABLE LOOP

FIELD OF THE DISCLOSURE

The subject disclosure relates to a quantum enabled hybrid fiber cable loop.

BACKGROUND

Quantum networks support an exchange of information in the form of quantum bits, also called qubits, between physically separated endpoints. Quantum networks include quantum processors adapted for storing and processing information and quantum channels that link the processors. Sharing entanglement over endpoint nodes through a quantum channels enables physical implementations of quantum cryptography, quantum secret sharing and distributed quantum computation.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
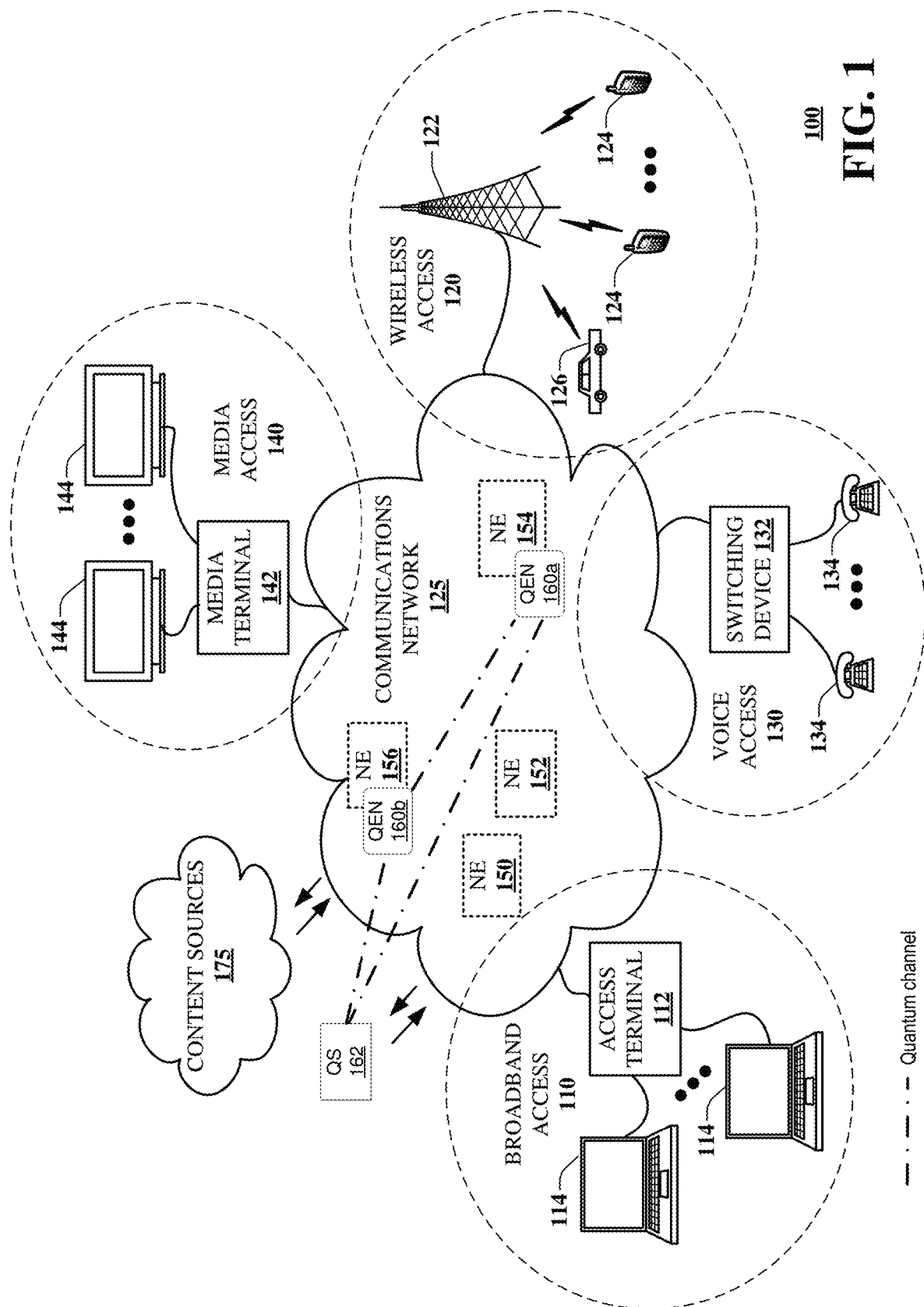
FIG. 1 is a block diagram illustrating an exemplary, non-limiting embodiment of a communications network in accordance with various aspects described herein.

The subject disclosure describes, among other things, illustrative embodiments of quantum enabled network architectures adapted to incorporate an entanglement distribution function in a typical telecommunication infrastructure by incorporating quantum enable nodes (QEN), e.g., in combination with an optical fiber network, such as a metropolitan fiber network, and in combination with local quantum agents (QA) that manage interactions between the QEN and a source of entangled objects. The quantum enablement provides generation of groups of quantum entangled objects and efficient distribution of the entangled objects among those nodes of the telecommunication network that require quantum processing. Other embodiments are described in the subject disclosure.

In particular, the embodiments disclosed herein provide quantum-enabled HFC network that incorporates software defined network (SDN) architecture. In at least some embodiments, a free-space optical link, such as a satellite link, are applied as intermediate, trusted node. According to the techniques disclosed herein, an HFC network or loop, e.g., consisting of fiber and coax, can select an efficient quantum entanglement end-to-end distribution path or set of paths using a centralized SDN intelligence. Owing to channel loss, the main challenge for a practical quantum networking is to extend the communication range to long distances. Distance is still a factor of efficient quantum entanglement distribution for long distance. SDN can be configured with a prior knowledge of distances among quantum channel nodes supporting the HFC network to identify and configure path routing information for any specific traffic, e.g., in support of a service level agreement (SLA) and in real time.

One or more aspects of the subject disclosure include a system, including a processing system having a processor and a memory that stores executable instructions that, when executed by the processing system, facilitate performance of operations. The operations include receiving a request for communications between a first communication node and a second communication node, determining that the communications require a quantum channel, and identifying a first network routing path of a group of network routing paths according to the quantum channel. Quantum entanglement is established between the first communication node and the second communication node based on transportation of a first quantum entangled photon of a first pair of quantum entangled photons via the first network routing path, resulting in a transported first quantum entangled photon of the first pair of quantum entangled photons. The operations further include initiating a classical communication channel between the first communication node and the second communication node, the classical communication channel adapted to communicate quantum state information from the first communication node to the second communication node to obtain communicated quantum state information, wherein the quantum state information is obtained from a measurement performed upon a second quantum entangled photon of the first pair of quantum entangled photons. Information is exchanged between the first communication node and the second communication node via the quantum channel according to the transported first quantum entangled photon of the first pair of quantum entangled photons and the communicated quantum state information.

One or more aspects of the subject disclosure include a process that includes detecting, by a processing system including a processor, a request to facilitate communications, to obtain requested communications, between a first communication node and a second communication node, determining, by the processing system, that the requested communications be established via quantum teleportation between the first communication node and the second communication node, the quantum teleportation based on a quantum entanglement among a first group of quantum entangled objects, and identifying, by the processing system, a network path of a group of network paths according to a quantum channel. Quantum entanglement is established between the first communication node and the second communication node based on transportation of a first quantum entangled object of the first group of quantum entangled objects via a first path segment of the network path, resulting in a transported first quantum entangled object. The process further includes facilitating, by the processing system, a classical communication channel between the first communication node and the second communication node, the classical communication channel supporting an exchange of quantum state information of the first quantum entangled object from the first communication node to the second communication node to obtain exchanged quantum state information. Information is exchanged between the first communication node and the second communication node via the quantum channel according to the transported first quantum entangled object and the exchanged quantum state information.

One or more aspects of the subject disclosure include a non-transitory, machine-readable medium, comprising executable instructions that, when executed by a processing system including a processor, facilitate performance of operations. The operations include identifying a request to facilitate communications between a first processing node and a second processing node, determining that the communications be established via quantum teleportation between the first processing node and the second processing node, the quantum teleportation based on a quantum entanglement among a group of quantum entangled objects, and identifying a network path comprising a first path segment to obtain a quantum channel. Quantum entanglement is established between the first processing node and the second processing node based on transportation of a first quantum entangled object of the group of quantum entangled objects via the quantum channel, resulting in a transported first quantum entangled object. The operations further include facilitating a classical communication channel between the first processing node and the second processing node, the classical communication channel adapted to exchange quantum state information of a measurement performed upon the first quantum entangled object from the first processing node to the second processing node to obtain exchanged quantum state information. Information is exchanged between the first processing node and the second processing node via the quantum channel according to the transported first quantum entangled object and the exchanged quantum state information.

One or more aspects of the subject disclosure include a system having a processing system including a processor and a memory. The memory stores executable instructions that, when executed by the processing system, facilitate performance of operations. The operations include determining that quantum entanglement be established between a first node and a second node of a service provider network comprising a software defined network (SDN) that facilitates delivery of a service to a service subscriber. According to the operations, a quantum path is selected between the first node and the second node based on pre-provisioned information supplied by the SDN; calculating a path length of the quantum path based on the pre-provisioned information supplied by the SDN, and a quantum repeater node is identified responsive to the path length exceeding a threshold, wherein the quantum path comprises a first segment between the first node and the quantum repeater and having a segment length that does not exceed the threshold. A sharing of a quantum entanglement state is facilitated between the first node and the second node to obtain a shared quantum entanglement state based on transportation of a first photon of a first entangled pair of photons via the first segment.

One or more aspects of the subject disclosure include a process that includes determining, by a processing system including a processor, that quantum entanglement be established between a first node and a second node of a service provider network comprising a software defined network (SDN) that facilitates delivery of a service to a service subscriber. The process further includes identifying, by the processing system, a path between the first node and the second node based on pre-provisioned information supplied by the SDN, and determining, by the processing system, a path length of the path based on the pre-provisioned information supplied by the SDN. The process further includes identifying, by the processing system, a repeater node responsive to the path length exceeding a threshold, wherein the path includes a first segment between the first node and the repeater node having a segment length that does not exceed the threshold; and facilitating, by the processing system, a sharing of a quantum entanglement state between the first node and the second node to obtain a shared quantum entanglement state based on transportation of a first photon of a first entangled pair of photons via the first segment.

One or more aspects of the subject disclosure include a non-transitory, machine-readable medium, including executable instructions that, when executed by a processing system including a processor, facilitate performance of operations. The operations include determining that quantum entanglement be established between a first node and a second node of a service provider network comprising a software defined network (SDN) that facilitates delivery of a service to a service subscriber; identifying a path between the first node and the second node based on pre-provisioned information supplied by the SDN. The operations further include estimating a path length of the path based on the pre-provisioned information supplied by the SDN, and selecting a quantum repeater node responsive to the path length exceeding a threshold, wherein the path comprises a first segment between the first node and the quantum repeater having a segment length that does not exceed the threshold. According to the operations, a sharing of a quantum entanglement state is facilitated between the first node and the second node to obtain a shared quantum entanglement state based on transportation of a first photon of a first entangled pair of photons via the first segment.

Referring now to FIG. 1, a block diagram is shown illustrating an example, non-limiting embodiment of a communications network 100 in accordance with various aspects described herein. For example, communications network 100 can facilitate in whole or in part a generation of a quantum entangled group of objects, such as entangled photons, responsive to a request for processing, e.g., communication between remote processing nodes, that utilizes quantum entanglement. In particular, the quantum entangle objects of the group of objects, e.g., entangled photons, are generated and distributed in an efficient and reliable manner to one or more of the processing nodes based on the request. Quantum agents (QA) are employed, that in at least some applications, evaluate communication and/or processing requests to determine whether quantum entanglement is required. The network 100 can include a local QAs at one or more of the processing nodes. Having identified communications and/or processing nodes to be entangled, one or more quantum channels are identified to support transportation of the entangled objects from an entanglement source to remote destinations to facilitate quantum entanglement between endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source processing node, a destination processing node and possibly one or more intermediate nodes, such as a quantum repeater node.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The various examples and architectures disclosed herein facilitate distribution of quantum entanglement, a building block of the entangled quantum networking. In at least some applications, the quantum entanglement distribution architectures are employed in combination with wireless communications, e.g., radio access networks (RAN), including wireless applications according to standards of the 3rd Generation Partnership Project (3GPP). Examples include, without limitation, the Global System for Mobile Communications (GSM) standard, and related 2G and 2/5G standards, including General Packet Radio Service (GPRS) and Enhanced Data rates for GSM Evolution (EDGE), $3^{rd}$ generation (3G) standards, such as Universal Mobile Telecommunications System (UMTS), $4^{th}$ generation (4G) standards, such as Long-Term Evolution (LTE), LTE Advanced, and $5^{th}$ generation (5G) standards, such as 5G NR (New Radio).

The exchange of quantum information between remote locations is achievable through quantum entanglement distribution between remote nodes, e.g., according to an Einstein, Podolsky, and Rosen (EPR) pair, such as an entangled pair of photons. For many applications of quantum information, such as quantum key distribution (QKD), hyperdense or super-dense coding, and teleportation, the entanglement distribution, that is the distribution of the entangled qubits between a source node and a destination node is a core requirement. Such entanglement distribution will also be necessary for any realization of an entangled core network structure of a quantum Internet. According to hyperdense coding, more than one classical bit of information can be encoded into one quibit. An EPR pair is a pair of qubits that are in a Bell state together. Bell states refer to specific quantum states of a quantum entangled systems. For a two-qubit system, the Bell states include four specific maximally entangled quantum states of the pair. As a consequence of the pair's entanglement, a measurement of one member of the pair, i.e., one qubit, will assign a value to the other qubit immediately. This can occur in one of four ways for the pair, in which where the value assigned depends on which Bell state the two qubits are in.

By using quantum superposition, or quantum entanglement, and transmitting information in quantum states, a communication system is well suited for detecting eavesdropping. Quantum entanglement is the shared state of two separate particles, such that what happens to one happens to other. More generally, the entanglement process includes creation of a pair of qubits, e.g., photons of light, in a particular, e.g., a single, quantum state. According to quantum entanglement, even if the pair of qubits are separated and transported to remote destinations, e.g., in opposite directions, they retain in an entangled state, suggesting a quantum connection. According to the quantum connection, any change in the quantum state of one photon will instantaneously and irreversibly change the state of the other one in a predictable way, despite an arbitrary separation distance. For example, measurement of one qubit will assign one of two possible values to the other qubit instantly. Accordingly, it can be said that the quantum state is teleported from one node to another.

Such quantum teleportation requires first establishing separation of a pair of entangled photons between two nodes, e.g., network element 154 (node A) and network element 156 (node B). As a prerequisite for quantum teleportation, an entangled pair of photons is generated or otherwise created, e.g., at an entanglement source or generator. In some embodiments, each of nodes A and B receives a respective entangled photon or qubit of the entangled pair, e.g., via any of the example quantum entanglement architectures disclosed herein. Node A, a source in this example, permits its entangled photon to interact with a "memory qubit" that holds data intended for transmission from node A to node B. This interaction changes the state of node A's photon, and through quantum entanglement, while also simultaneously changing the state of node B's photon too. In effect, this process "teleports" the information obtained from A's memory qubit from node A to node B, via the shared entangled photon pair.

The illustrative communications network 100, includes a first quantum enabled node (QEN) 160*a* and a second quantum enabled node 160*b*, and a quantum source (QS) 162. The first QEN 160*a* is associated with the first NE 154 (node A); whereas, the second QEN 160*b* is associated with the second NE 156 (node B). The QENs 160*a*, 160*b*, generally 160, are adapted to process quantum entangled objects, such as entangled photons. The quantum source 162 generates an entangled pair, e.g., an entangled photon pair, and distributes one of the entangled photons to the first QEN 160*a* via a first quantum channel, and a second one of the entangled photons to the second QEN 160*b*. Once distributed in this manner, each of the QENs 160*a*, 160*b* share quantum entanglement by way of the shared pair of entangled photons. In physically realizable systems, transportation of an entangled object, such as an entangled photon, may be subject to limitations, such as decay, noise, time delay. Depending upon a physical separation of, and/or a network configuration between the end nodes, i.e., nodes A and B, one or more additional quantum entangled objects, e.g., entangled photon pairs, may be utilized to extend entanglement. Through a process known as entanglement swapping, entanglement can be transferred, or swapped, onto two particles that originated from different sources and were formerly completely independent. This is the first time that two autonomous photons from continuous sources have been entangled. Quantum processing can include, without limitation, one or more of receiving a qubit, storing a qubit, and performing a measurement on a received and/or stored qubit, e.g., to obtain quantum information, such as a quantum state.

According to entanglement swapping, independent pairs of entangled qubits can be generated by autonomous sources. A joint measurement can be performed on one qubit from each of the independent pairs such that the two pairs enter into an entangled state. The two remaining qubits of the two independent pairs can be projected onto an entangled state despite their being unaware of each other's presence and never having previously interacted.

In at least some applications, quantum processing, e.g., quantum teleportation, also includes a sharing of a quantum measurement result between the QENs 160*a*, 160*b*. For example, if the first QEN 160*a* performs a measurement to impress information onto its shared qubit, the measurement result obtained at the first QEN 160*a* can be transmitted to the second QEN 160*b* via a classical communication channel, e.g., without using entanglement. Such a transfer of the measurement result allows the second QEN 160*b* to perform an independent measurement on its shared quibit, to confirm that its measurement result is consistent with the result shared via the classical communications channel, signifying a quantum teleportation of information from the first QEN 160*a* to the second QEN 160*b*. The classical communication channel can include one or more of the various communications supported by the communications network 125. Although the example QENs 160 are illustrated as being provided in association with the NEs 154, 156 of the communication network, it is envisioned that one or more of the QENs 160 can likewise be included at any one or more of the broadband access 110, the voice access 130, the wireless access 120 and the media access 140 elements. Additionally, in at least some embodiments, the quantum source 162 can be collocated with a source QEN 160*a*, such that a separate quantum channel would be unnecessary as one of a generated pair of entangled objects would already be present at the source QEN 160*a*.

A long-distance entanglement distribution can be adapted to address or otherwise overcome challenges resulting from a decay of any realizable entanglement distribution rate as a function of the distance. As mentioned above, Einstein-Podolsky-Rosen (EPR) is a building block of entanglement-based and entanglement-assisted quantum communication protocols. A prior shared EPR pair and an authenticated classical channel allow two distant users to share information, e.g., a secret key. The example network architecture provides at least one centralized EPR source that can create entangled states by a process of spontaneous parametric down-conversion (SPDC). Once generated, the states can be routed and/or otherwise distributed to users in different access networks.

Figure 2A:
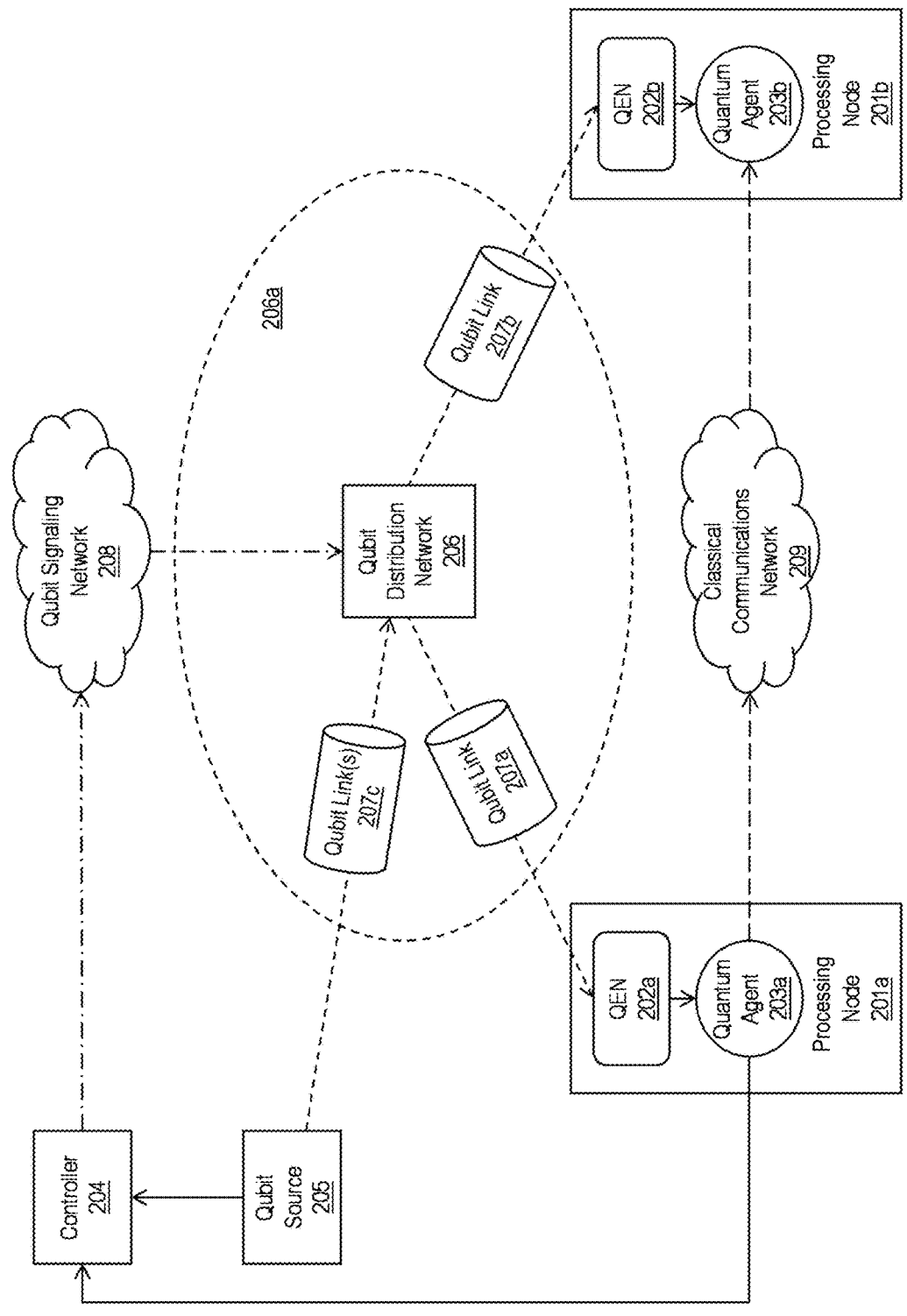
FIG. 2A is a block diagram illustrating an example, non-limiting embodiment of a quantum entanglement distribution system functioning within the communication network of FIG. 1 in accordance with various aspects described herein.

FIG. 2A is a block diagram illustrating an example, non-limiting embodiment of a quantum entanglement distribution system 200 functioning within the communication network of FIG. 1 in accordance with various aspects described herein. The system 200 includes two processing nodes, referred to herein as a first processing node 201*a* and a second processing node 201*b*. The first processing node 201*a* includes a first quantum enabled node 202*a* and a first quantum agent 203*a*. Likewise, the second processing node 201*b* includes a second quantum enabled node 202*b* and a second quantum agent 203*b*. In at least some embodiments, information can be shared or otherwise exchanged between the two processing nodes 201*a*, 201*b*, generally 201, through a process that relies at least in part upon a so-called entanglement, or quantum entanglement between the processing nodes 201.

Quantum entanglement occurs when two distinct physical systems, e.g., the two processing nodes 201, are attributed non-separable quantum states. The quantum states can be established by generating entangled objects at one location, physically separating the entangled objects and transporting one or both of the entangled objects to other locations to effectively share portions of the entangled objects. A two-level quantum system, is referred to as a quantum bit or qubit. For example, an entangled pair of qubits can be generated, a first qubit of an entangled pair of qubits can be provided to the first processing node 201*a*, and a second qubit of the entangled pair of qubits can be provide to the second processing node 201*b*. Accordingly, the two processing nodes 201, may share halves of two qubit entangled states. In such an entangled state, a special interrelationship exists between the nodes 201, in which measuring an object, e.g., the first qubit of the entangled pair, instantly influences the other, e.g., the second qubit of the entangled pair, even if the two are completely isolated and/or separated from one another. Thus, if one of the entangled qubits is measured in any basis to have a definite physical state, such as a polarization of a photon, then the state of the other must be exactly complementary to this polarization.

According to the illustrative embodiment, the system 200 further includes a quantum entanglement source 205, adapted to generate a quantum entangled group of objects, e.g., a qubit and/or a group of qubits. One or more members of the quantum entangled group of objects can be physically transported to one or more target locations via an entanglement distribution system 206*a*. According to the illustrative example, the entanglement distribution system 206*a* includes one or more quantum channels, or links 207*a*, 207*b*, 207*c*, adapted to transport one or more of the members of the quantum entangled group of objects. It is understood that the entanglement distribution system 206*a* can include at least one configurable element, such as a switch and/or a router adapted to selectively control the distribution of the quantum entangled group of objects. According to the illustrative example, the entanglement distribution system 206*a* includes an entanglement distribution network 206.

In some embodiments, the entanglement distribution network 206 includes a fiber optic system. Example fiber optic systems include, without limitation, direct, point-to-point fiber optic links, e.g., between the quantum enabled nodes 202*a*, 202*b* and/or between the quantum entanglement source 205 and one or more of the quantum enabled nodes 202*a*, 202*b*. Alternatively or in addition, the entanglement distribution network 206 includes one or more of a fiber ring network and a fiber mesh network. Distribution and/or routing of entangled photons can include one or more of add/drop multiplexers, wavelength division multiplexers, switches, e.g., cross bar switches, optical routers and the like. In at least some embodiments, the fiber optic network includes, so-called, deep fiber that extends at or at least relatively close to endpoint destinations, e.g., households, apartment buildings, business, and the like. It is understood that existing fiber optic networks and/or links can be used in whole or in part to facilitate distribution of entangled photons according to the disclosed embodiments.

In general, the entanglement distribution network 206 facilitates distribution of one or more qubits from a qubit source, e.g., an independent qubit source 205, to one or more of the quantum enabled nodes 202*a*, 202*b* of the communications nodes 201. The entanglement distribution network 206 can include one or more switches, routers, and/or other configurable network elements adapted to establish quantum channel links. Depending upon a configuration of the entanglement distribution network 206, one or more of the quantum entangled group of objects can be selectively directed to one or more locations, such as the first processing node 201*a*, the second processing node 201*b*, or both the first and second processing nodes 201*a*, 201*b*, via one or more of the quantum channels 207*a*, 207*b*, 207*c*, generally 207.

The illustrative embodiment of the quantum entanglement distribution system 200 includes an entanglement distribution controller 204. The controller 204 can generate and/or apply logic, and/or policies, and/or algorithms and the like, to facilitate entanglement distribution, by directing one or more members of the quantum entangled group of objects to predetermined locations, e.g., processing nodes 201, or more particularly, quantum enabled nodes 202*a*, 202*b*, as detailed further below. For example, the controller 204 may select one or more quantum communication links and/or configuration(s) of one or more configurable elements of a quantum communication link or channel. In at least some embodiments, the controller 204 determines a suitable configuration of the configurable entanglement distribution network 206, and conveys one or more control signals to the configurable entanglement distribution network 206. The control signals cause the entanglement distribution network 206 to configure, or reconfigure itself facilitate transport of the members of the quantum entangled group of objects to their predetermined or intended locations. The control signals can be directed from the controller 204 to the configurable entanglement distribution network 206 via a control or signaling channel, such as a quantum entanglement signaling channel or network 208.

It is envisioned that in at least some embodiments, the quantum entanglement signaling channel or network 208 comprises one or more classical communications channels, i.e., not specifically employing quantum entanglement, quantum processing and/or quantum teleportation. However, it is further envisioned that in at least some embodiments, the quantum entanglement signaling channel or network 208 can employ a quantum channel, e.g., a quantum link 207. For example, control and/or configuration information for a second quantum link may be exchanged between the controller 204 and the configurable entanglement distribution network 206 via quantum entanglement over a first, pre-established quantum link.

In more detail, the first quantum enabled node 202*a* is in communication with the first quantum agent 203*a*. Likewise, the second quantum enabled node 202*b* is in communication with the second quantum agent 203*b*. The first and second quantum agents 203*a*, 203*b* can be in communication with each other via a classical communications channel or network 209, i.e., not relying upon qubits or entanglement sharing. At least one of the quantum agents 203, e.g., the first quantum agent 203*a*, is in communication with the controller 204. At least one of the first or second quantum agents 203a, 203b is in communication with the controller 204. In at least some embodiments, communications between the quantum agent 203 and the controller 204 may be accommodated via a classical communications channel or network, i.e., not relying upon qubits or entanglement sharing.

The controller 204 can be implemented as a standalone processing device, such as a dedicated server. Alternatively or in addition, the controller 204, without limitation, can be combined with or otherwise hosted on another system, such as a telecommunications system controller, a terrestrial network controller, a fiber optic network controller, a cable network controller, a wireless link controller, a satellite link controller, and the like. The controller 204 may be combined with or otherwise collocated with the qubit source 205. Alternatively, the controller 204 may be remoted from the qubit source 205. When remoted, the controller 204 can be in communication with the qubit source 205 via a telecommunications network, a terrestrial packet switched network, a fiber optic network, a cable network, a wireless network, a satellite network controller, and the like.

In some embodiments, one or more of the processing nodes 201 are communications nodes, e.g., sharing quantum entanglement and exchanging information with one or more other processing nodes 201, via quantum teleportation. According to quantum communications, entangled photons are used to transfer information between nodes, in which a source node or sender holds half of the entangled photons, while the destination node or receiver holds the other half. Communication can be made possible by manipulation of the photons at one of the source and destination, resulting in an instantaneous change in the corresponding photons.

Alternatively or in addition, the processing nodes 201 can include quantum processors adapted to store and/or otherwise manipulate or process qubits. Quantum processors rely on quantum bits, or qubits, instead of classical bits. Since qubits can exist in multiple states, e.g., a '0' and a '1,' known as superposition, they can support performance of multiple calculations at once, while traditional bits are confined to only a 0 or a 1, limiting them to one calculation at a time. When one quantum processor changes the states of its photons, the corresponding entangled photons are changed in the other quantum processor, thus transferring the necessary qubits.

The qubit source 205 may include a microscopic system, such as an atom, e.g., atomic nuclei, in which entanglement is shared via a nuclear spin, or a photo in which entanglement may be shared by one or more of polarized or orbital angular momentum. Qubits that utilize photons can be carried or otherwise transported along optical channels. For example, one or more of the quantum channels or links 207 that convey polarized photons can include optical fiber, free space, or a combination of optical fiber and free-space optical links. A processing node 201 adapted for processing photon-based qubits may include a photon detector, e.g., a single photon detector, a polarization detector, a quantum storage element to store qubits received from the quantum entanglement source 205.

The quantum agent 203 can include a processor, such as a microprocessor adapted to execute a preprogrammed instruction set to interact with the quantum enabled node 202 to facilitate generation of entanglement between itself and a quantum agent of another node. Facilitating generation of entanglement can include one or more of: (i) identifying a source processing node 201a and/or a destination node 201b, and possibly an intervening node, such as a quantum repeater to identify a particular quantum channel; (ii) requesting generation of and/or dissemination of entangled qubits among processing nodes 201 of the particular quantum channel; (iii) performing measurements on at least one of a pair of entangled qubits shared via at least a portion of the particular quantum channel; (iv) determining entangled state information, such as a state of at least one of the shared pair of entangled qubits; and (v) sharing the determined state information with the destination node 201.

A local QA 203a can be preconfigured with a list of QENs 202, such as a list of QENs 202 accessible by the entanglement distribution network 206. It is understood that in at least some applications, one or more of the QENs 202 are preconfigured with connectivity tables. Alternatively or in addition, the QA 203a can be preconfigured, e.g., preprogrammed, with logic and/or policies adapted to implement, control and/or otherwise manage quantum entanglement distribution. For example, the QA 203a can receive a request for processing at one or more processing nodes 201, and determine whether the processing should employ quantum entanglement. The request for processing can include a request for communications between processing nodes 201, a request for quantum encryption of information at one or more of the processing nodes 201, and/or to communications between processing nodes 201. Determinations requiring quantum entanglement can be based on one or more of various conditions, such as an imposed and/or requested security level of processed information, a location of one or more of the processing nodes 201, e.g., in a secure facility, a sender and/or recipient identity, a level of subscription, and the like.

Alternatively or in addition, determinations requiring quantum entanglement can be based on a quantity of data to be processed, a processing timing requirement, channel conditions, channel capacity of the classical communications network 209 and/or the entanglement distribution network 206, and/or any one or more of the quantum links 207. Alternatively or in addition, the determinations requiring quantum entanglement can be based on quantum source 205 availability and/or capacity, success and/or failures of prior attempts to establish entanglement, time of day, network routing path geometry, etc. It is further understood that determinations requiring quantum entanglement, including in any of the foregoing examples, can depend upon a threshold value, e.g., a security level threshold, a time delay threshold, a channel capacity threshold, a link length and or number of nodes threshold, and the like.

The QA 203a, having received a request for communication between two nodes 201, and having determined that quantum entanglement should be applied, determines a configuration of a quantum channel for transporting one or more entangled objects, e.g., photons. The configuration can be determined according to predetermined parameters, such as maximum allowable link distances to ensure reliable transport of the quantum entangled photon(s) to intended destination(s). Preferences can be established to minimize link distances and/or numbers of intermediate nodes. Configurations can be determined according to availability of QENs 202 at a source, a destination and/or any intermediate nodes. For systems in which there may be more than one quantum source 205, configuration can include identification of the one or more sources 205 and/or link selection and/or network configurations between the one or more sources 205, the source node, the destination node and/or any intervening nodes.

In at least some configurations, quantum repeaters may be available. To the extent they are, configurations may be selected to employ the available quantum repeaters, and/or to avoid them when possible, and/or to minimize their use in order to establish and/or maintain a relatively low complexity and/or high reliability of the quantum distribution.

Figure 2B:
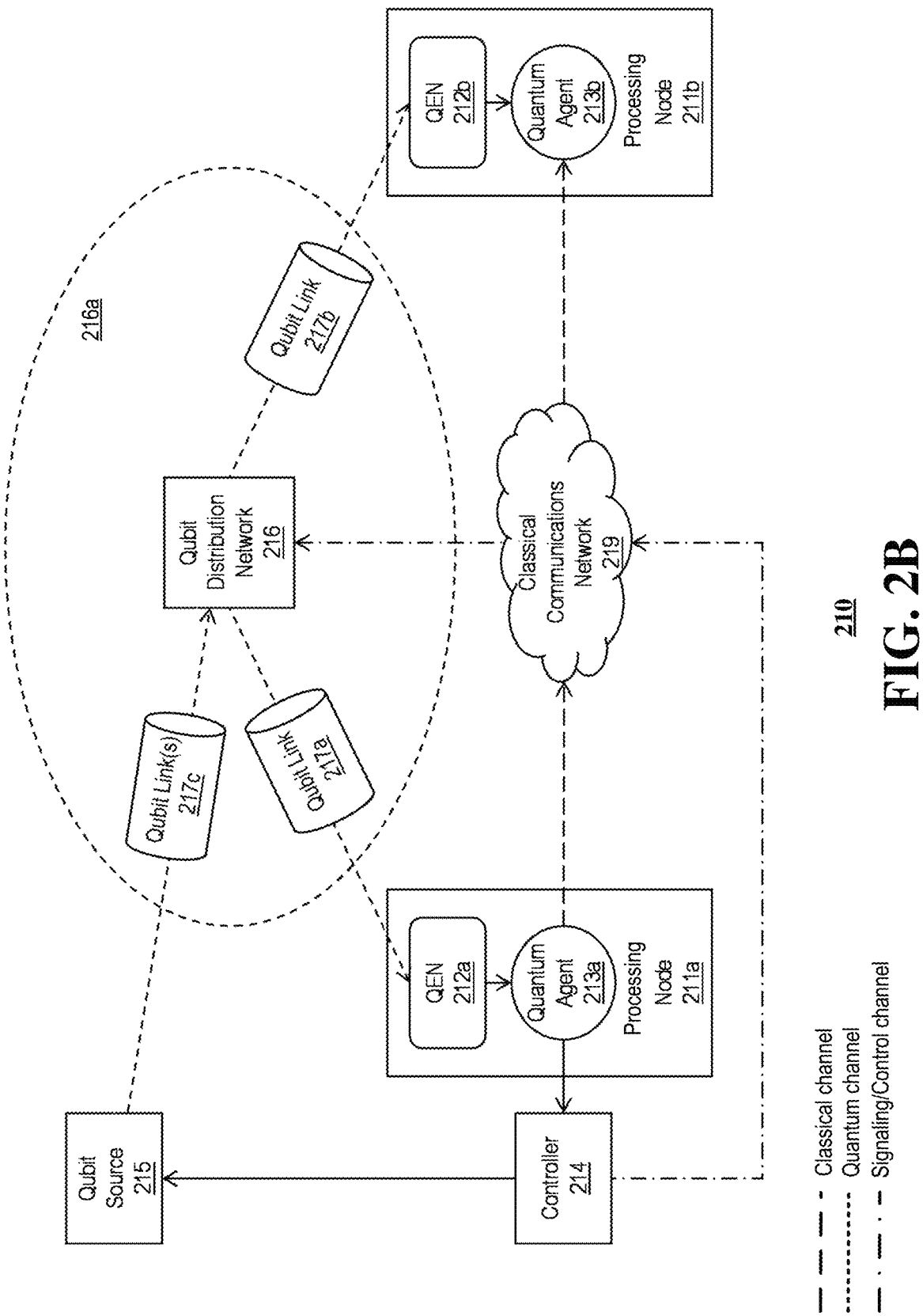
FIG. 2B is a block diagram illustrating an example, non-limiting embodiment of another quantum entanglement distribution system functioning within the communication network of FIG. 1 in accordance with various aspects described herein.

FIG. 2B is a block diagram illustrating an example, non-limiting embodiment of another quantum entanglement distribution system 210 functioning within the communication network of FIG. 1 in accordance with various aspects described herein. The system 210 includes a first processing node 211a and a second processing node 211b. The first processing node 211a includes a first QEN 212a and a first QA 213a. Likewise, the second processing node 211b includes a second QEN 212b and a second QA 213b. The system 210 further includes a quantum entanglement source 215, adapted to generate a quantum entangled group of objects, e.g., a qubit and/or a group of qubits. One or more members of the quantum entangled group of objects can be physically transported to one or more target locations via an entanglement distribution system 216a. According to the illustrative example, the entanglement distribution system 216a includes one or more quantum channels, or links 217a, 217b, 217c, adapted to transport one or more of the members of the quantum entangled group of objects. It is understood that the entanglement distribution system 216a can include at least one configurable element, such as a switch and/or a router adapted to selectively control the distribution of the quantum entangled group of objects. According to the illustrative example, the entanglement distribution system 216a includes an entanglement distribution network 216.

In general, the entanglement distribution network 216 facilitates distribution of one or more qubits from the qubit source 215, to one or more of the quantum enabled nodes 212a, 212b of the communications nodes 211. The entanglement distribution network 216 can include one or more switches, routers, and/or other configurable network elements adapted to establish quantum channel links. Depending upon a configuration of the entanglement distribution network 216, one or more of the quantum entangled group of objects can be selectively directed to one or more locations, such as the first processing node 211a, the second processing node 211b, or both the first and second processing nodes 211a, 211b, via one or more of the quantum channels 217a, 217b, 217c, generally 217.

The first and second quantum agents 213a, 213b can be in communication with each other via a classical communications channel or network 219, i.e., not relying upon qubits or entanglement sharing. At least one of the first or second quantum agents 213a, 213b is in communication with the controller 214. In at least some embodiments, communications between the quantum agent 213 and the controller 214 may be accommodated via a classical communications channel 219 or network, i.e., not relying upon qubits or entanglement sharing. According to the illustrative embodiment, the controller 214 can communicate with the quantum distribution network 216 via the classical communications network 219, e.g., foregoing the need for a separate and/or independent quantum channel signaling network.

Any of the elements, such as the QAs, 213, the controller 214, and/or the QENs 212 can be preconfigured with a list of QENs 212, such as a list of QENs 212 accessible by the quantum distribution network 216, connectivity tables, logic and/or policies adapted to implement, control and/or otherwise manage quantum entanglement distribution, e.g., as disclosed in reference to FIG. 2A.

Figure 2C:
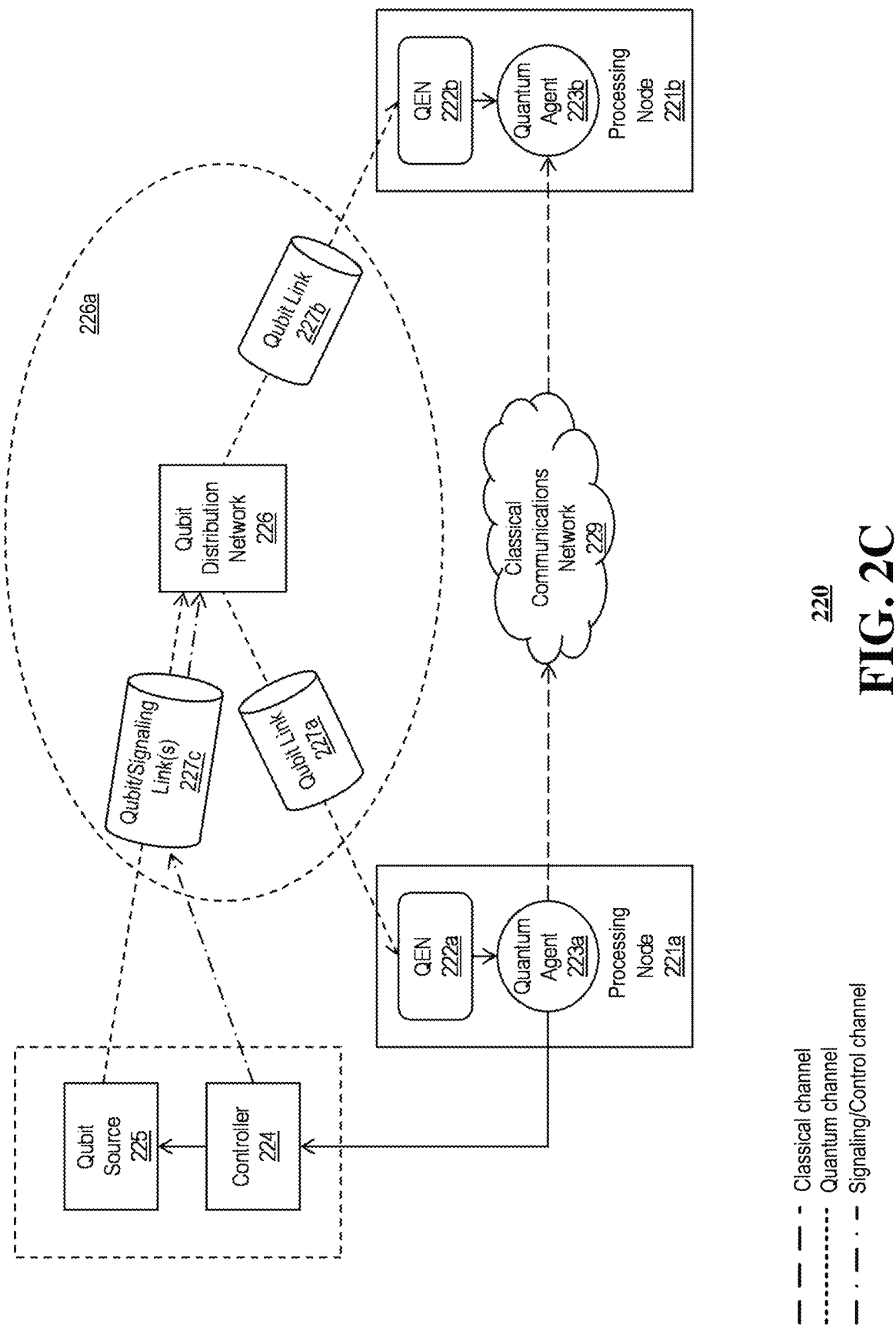
FIG. 2C is a block diagram illustrating an example, non-limiting embodiment of another quantum entanglement distribution system functioning within the communication network of FIG. 1 in accordance with various aspects described herein.

FIG. 2C is a block diagram illustrating an example, non-limiting embodiment of another quantum entanglement distribution system functioning within the communication network of FIG. 1 in accordance with various aspects described herein. The system 220 includes a first processing node 221a and a second processing node 221b. The first processing node 221a includes a first QEN 222a and a first QA 223a. Likewise, the second processing node 221b includes a second QEN 222b and a second QA 223b. The system 220 further includes a quantum entanglement source 225, adapted to generate a quantum entangled group of objects, e.g., a qubit and/or a group of qubits. One or more members of the quantum entangled group of objects can be physically transported to one or more target locations via an entanglement distribution system 226a. According to the illustrative example, the entanglement distribution system 226a includes one or more quantum channels, or links 227a, 227b, 227c, adapted to transport one or more of the members of the quantum entangled group of objects. It is understood that the entanglement distribution system 226a can include at least one configurable element, such as a switch and/or a router adapted to selectively control the distribution of the quantum entangled group of objects. According to the illustrative example, the entanglement distribution system 226a includes an entanglement distribution network 226.

In general, the entanglement distribution network 226 facilitates distribution of one or more qubits from the qubit source 225, to one or more of the quantum enabled nodes 222a, 222b of the communications nodes 221. The entanglement distribution network 226 can include one or more switches, routers, and/or other configurable network elements adapted to establish quantum channel links. Depending upon a configuration of the entanglement distribution network 226, one or more of the quantum entangled group of objects can be selectively directed to one or more locations, such as the first processing node 221a, the second processing node 221b, or both the first and second processing nodes 221a, 221b, via one or more of the quantum channels 227a, 227b, 227c, generally 227.

The first and second quantum agents 223a, 223b can be in communication with each other via a classical communications channel or network 229, i.e., not relying upon qubits or entanglement sharing. At least one of the first or second quantum agents 223a, 223b is in communication with the controller 224. In at least some embodiments, communications between the quantum agent 223 and the controller 224 may be accommodated via a classical communications channel or network, i.e., not relying upon qubits or entanglement sharing. According to the illustrative embodiment, the controller 224 can communicate with the quantum distribution network 226 via the quantum links 227, e.g., also foregoing the need for a separate and/or independent quantum channel signaling network. For applications in which the quantum links include fiber optic links, the signaling information can be communicated over the quantum link 227 via a classical communication channel, e.g., independent from transport of a quantum entangled photon over the same link.

Any of the elements, such as the QAs, 223, the controller 224, and/or the QENs 222 can be preconfigured with a list of QENs 222, such as a list of QENs 222 accessible by the quantum distribution network 226, connectivity tables, logic and/or policies adapted to implement, control and/or otherwise manage quantum entanglement distribution, e.g., as disclosed in reference to FIG. 2A.

Figure 2D:
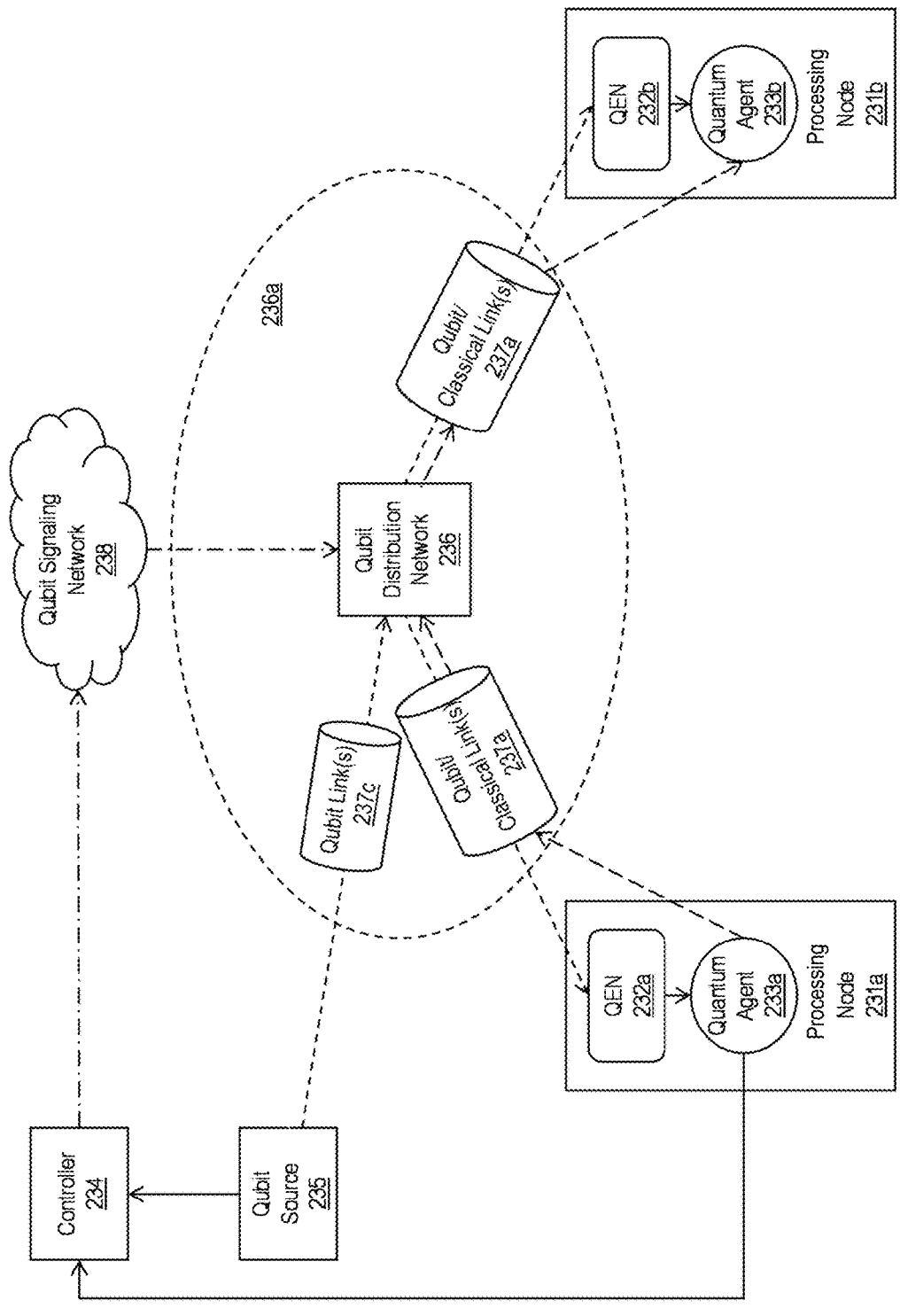
FIG. 2D is a block diagram illustrating an example, non-limiting embodiment of another quantum entanglement distribution system functioning within the communication network of FIG. 1 in accordance with various aspects described herein.

FIG. 2D is a block diagram illustrating an example, non-limiting embodiment of another quantum entanglement distribution system functioning within the communication network of FIG. 1 in accordance with various aspects described herein. The system 230 includes a first processing node 231a and a second processing node 231b. The first processing node 231a includes a first QEN 232a and a first QA 233a. Likewise, the second processing node 231b includes a second QEN 232b and a second QA 233b. The system 230 further includes a quantum entanglement source 235, adapted to generate a quantum entangled group of objects, e.g., a qubit and/or a group of qubits. One or more members of the quantum entangled group of objects can be physically transported to one or more target locations via an entanglement distribution system 236a. According to the illustrative example, the entanglement distribution system 236a includes one or more quantum channels, or links 237a, 237b, 237c, adapted to transport one or more of the members of the quantum entangled group of objects. It is understood that the entanglement distribution system 236a can include at least one configurable element, such as a switch and/or a router adapted to selectively control the distribution of the quantum entangled group of objects. According to the illustrative example, the entanglement distribution system 236a includes an entanglement distribution network 236.

In general, the entanglement distribution network 236 facilitates distribution of one or more qubits from the qubit source 235, to one or more of the quantum enabled nodes 232a, 232b of the communications nodes 231. The entanglement distribution network 236 can include one or more switches, routers, and/or other configurable network elements adapted to establish quantum channel links. Depending upon a configuration of the entanglement distribution network 236, one or more of the quantum entangled group of objects can be selectively directed to one or more locations, such as the first processing node 231a, the second processing node 231b, or both the first and second processing nodes 231a, 231b, via one or more of the quantum channels 237a, 237b, 237c, generally 237.

According to the illustrative embodiment, the QAs 233 can exchange quantum state information via a classical channel supported over one or more of the quantum links 237, e.g., also foregoing the need for a separate and/or independent classical communications channel. For applications in which the quantum links include fiber optic links, the quantum state information can be communicated over the quantum link 237 via a classical communication channel, e.g., independent from transport of a quantum entangled photon over the same link. The signaling information can be communicated over a signaling network 238, via a classical communication channel, e.g., independent from transport of a quantum entangled photon and/or the classical communications between QAs 233 over the quantum channel 237.

Any of the elements, such as the QAs, 233, the controller 234, and/or the QENs 232 can be preconfigured with a list of QENs 232, such as a list of QENs 232 accessible by the quantum distribution network 226, connectivity tables, logic and/or policies adapted to implement, control and/or otherwise manage quantum entanglement distribution, e.g., as disclosed in reference to FIG. 2A.

Figure 2E:
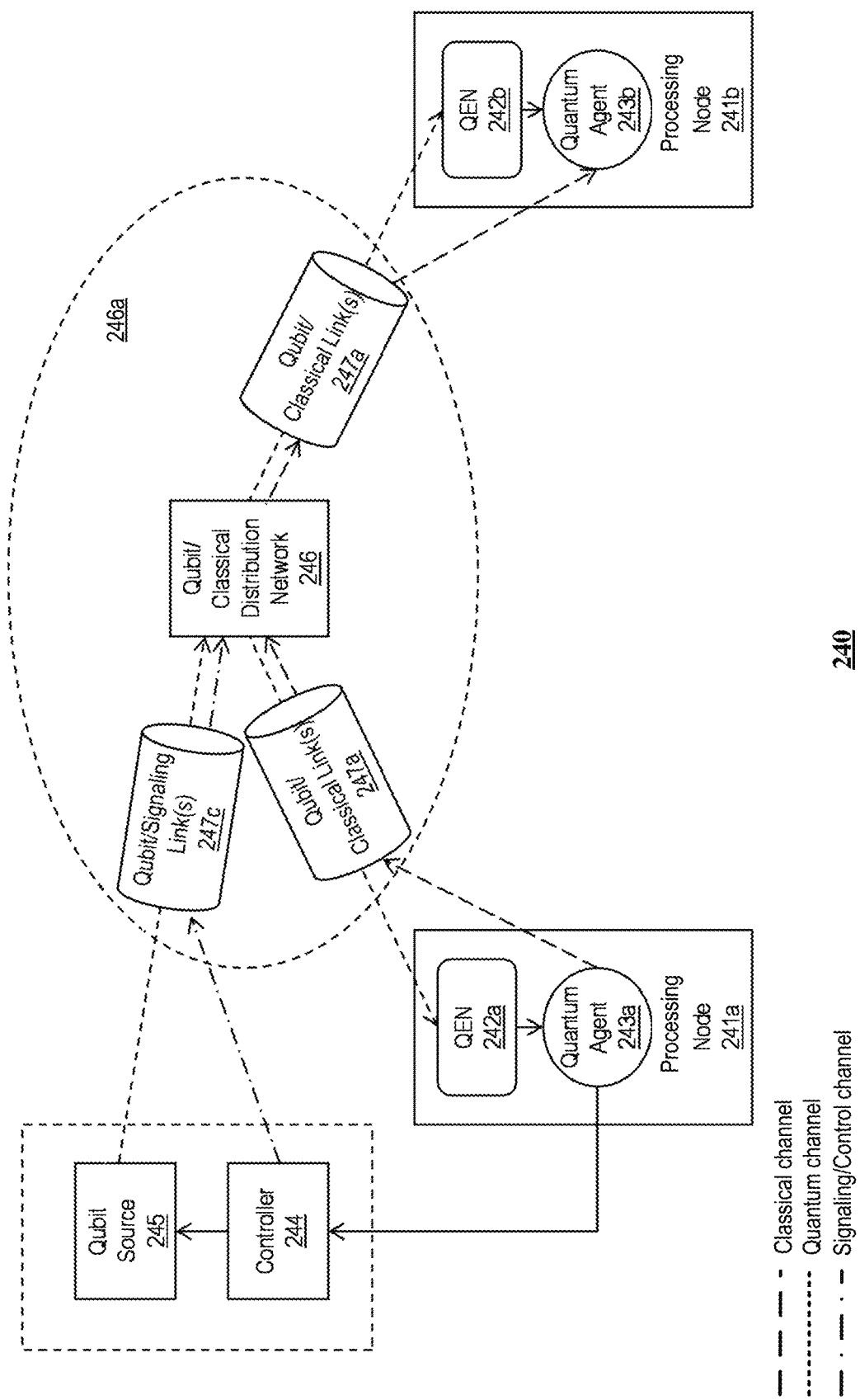
FIG. 2E is a block diagram illustrating an example, non-limiting embodiment of another quantum entanglement distribution system functioning within the communication network of FIG. 1 in accordance with various aspects described herein.

FIG. 2E is a block diagram illustrating an example, non-limiting embodiment of another quantum entanglement distribution system functioning within the communication network of FIG. 1 in accordance with various aspects described herein. The system 240 includes a first processing node 241a and a second processing node 241b. The first processing node 241a includes a first QEN 242a and a first QA 243a. Likewise, the second processing node 241b includes a second QEN 242b and a second QA 243b. The system 240 further includes a quantum entanglement source 245, adapted to generate a quantum entangled group of objects, e.g., a qubit and/or a group of qubits. One or more members of the quantum entangled group of objects can be physically transported to one or more target locations via an entanglement distribution system 246a. According to the illustrative example, the entanglement distribution system 246a includes one or more quantum channels, or links 247a, 247b, 247c, adapted to transport one or more of the members of the quantum entangled group of objects. It is understood that the entanglement distribution system 246a can include at least one configurable element, such as a switch and/or a router adapted to selectively control the distribution of the quantum entangled group of objects. According to the illustrative example, the entanglement distribution system 246a includes an entanglement distribution network 246.

In general, the entanglement distribution network 246 facilitates distribution of one or more qubits from the qubit source 245, to one or more of the quantum enabled nodes 242a, 242b of the communications nodes 241. The entanglement distribution network 246 can include one or more switches, routers, and/or other configurable network elements adapted to establish quantum channel links. Depending upon a configuration of the entanglement distribution network 246, one or more of the quantum entangled group of objects can be selectively directed to one or more locations, such as the first processing node 241a, the second processing node 241b, or both the first and second processing nodes 241a, 241b, via one or more of the quantum channels 247a, 247b, 247c, generally 247.

According to the illustrative embodiment, the QAs 243 can exchange quantum state information via a classical channel over one or more of the quantum links 247, e.g., also foregoing the need for a separate and/or independent classical communications channel. For applications in which the quantum links include fiber optic links, the quantum state information can be communicated over the quantum link 247 via a classical communication channel, e.g., independent from transport of a quantum entangled photon over the same link. Likewise, the controller 244 can communicate with the quantum distribution network 246 via a classical channel over the quantum link 247, e.g., foregoing the need for a separate and/or independent quantum channel signaling network.

Any of the elements, such as the QAs, 243, the controller 244, and/or the QENs 242 can be preconfigured with a list of QENs 242, such as a list of QENs 242 accessible by the quantum distribution network 246, connectivity tables, logic and/or policies adapted to implement, control and/or otherwise manage quantum entanglement distribution, e.g., as disclosed in reference to FIG. 2A.

Figure 2F:
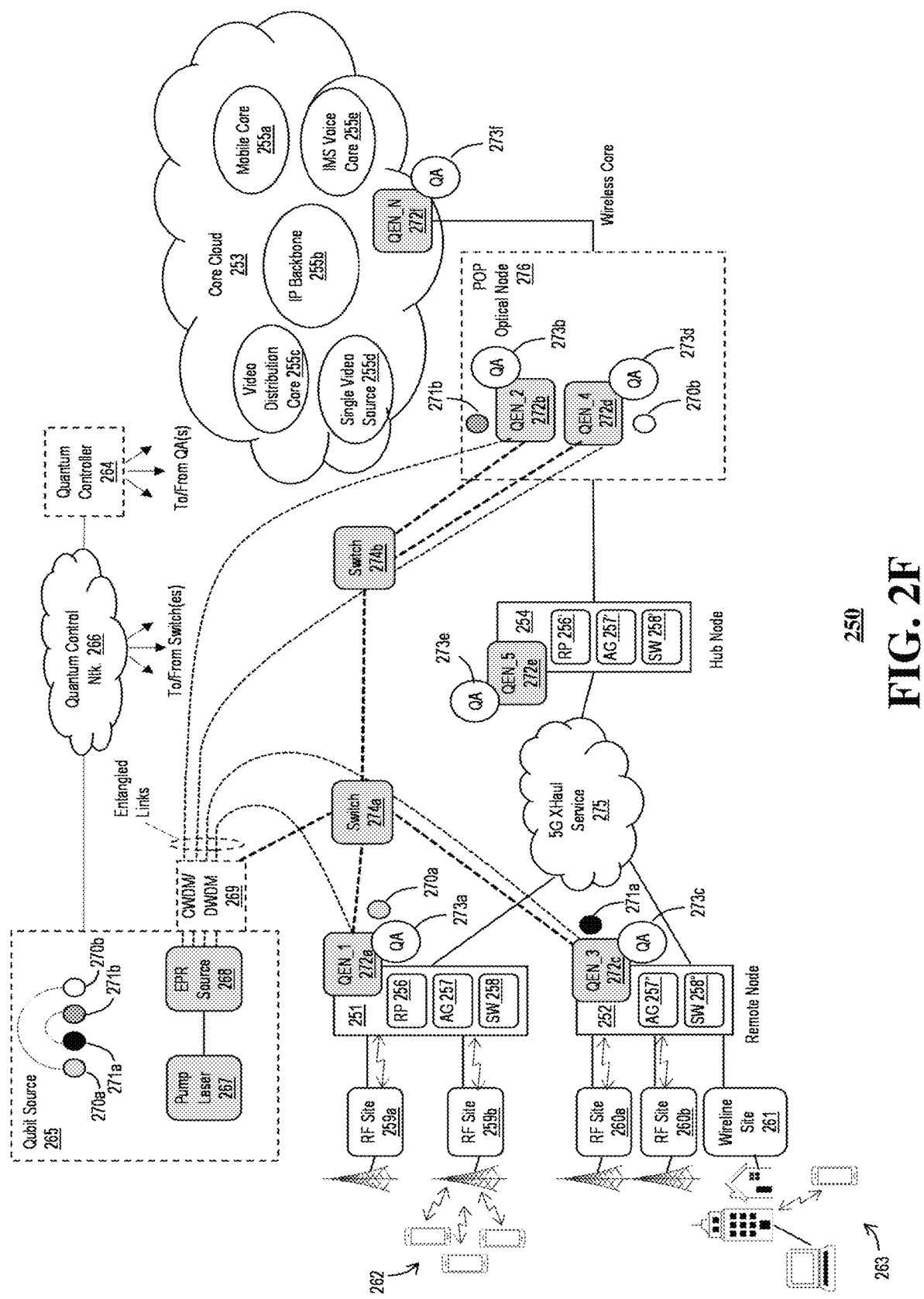
FIG. 2F is a block diagram illustrating an example, non-limiting embodiment of yet another quantum entanglement distribution system functioning within the communication network of FIG. 1 in accordance with various aspects described herein.

FIG. 2F is a block diagram illustrating an example, non-limiting embodiment of yet another quantum entanglement distribution system 250 functioning within the communication network of FIG. 1 in accordance with various aspects described herein. The system 250 includes a first communication node 251 and a second communication node 252. The communication nodes 251, 252 are in communication with a core network, e.g., a mobility core network, or core cloud 253, via a hub communication node 254. The core cloud 253 can include one or more components grouped according to their supported functionalities, such as a mobile core 255a, an IP backbone 255b, a video distribution core 255c, one or more single video sources 255d, an IMS voice core 255e, etc. The communication nodes 251, 252 and hub node 254 can include one or more of a radio processing (RP) subsystem, 256, 256', an augmentation subsystem 257, 257', 257" and a switch subsystem 258, 258', 258".

The first communication node 251 is in communication with one or more remote radio frequency (RF) sites 259a, 259b, which, in turn, can be in communication with one or more wireless, e.g., mobile communication devices 262, such as mobile phones, tablet devices, laptop devices, machines, e.g., according to machine-to-machine (M2M), or machine-type communications in an Internet of Things (IoT) application, and the like, via radio access networks (RANs), e.g., according to 3G, 4G 5G standards/applications, and the like, wireless access points, e.g., according to wireless network standards/applications, such as IEEE 802.11 wireless networks. Likewise, the second communication node 252 is in communication with one or more remote radio frequency (RF) sites 260a, 260b, which, in turn, can be in communication with one or more wireless, e.g., mobile communication devices via radio access networks (RANs). According to the illustrative example, the second communication node 252 is in further communication with a wireline site 261, such as a household, a business, a public facility, and so on, which can be in communication with one or more communication devices 263, including any of the example devices disclosed herein or otherwise known to those skilled in the art. The wireline site 261 can be in communication with the second communication node 252 via any suitable communication network, such as cable, optical fiber, twisted pair, e.g., DSL.

The quantum entanglement distribution system 250 includes a quantum controller 264, a quantum source, e.g., qubit source 265, and a quantum control network 266. The quantum controller is adapted to configure one or more of the quantum control network 266 and the quantum source 265 to generate quantum entangled objects, e.g., photons and to distribute them to one or more communication nodes 251, 253, 254 via quantum channels, all responsive to a request to establish entanglement between at least two predetermined communication nodes 251, 252, 254.

Any of the elements, such as the QAs, 253, the controller 254, and/or the QENs 272 can be preconfigured with a list of QENs 272, such as a list of QENs 272 accessible by the quantum distribution network, connectivity tables, logic and/or policies adapted to implement, control and/or otherwise manage quantum entanglement distribution, e.g., as disclosed in reference to FIG. 2A.

According to the illustrative example that uses photons as entanglement objects, the quantum source 265 includes a laser, e.g., a pump laser 267, and a qubit source, e.g., an EPR source 268. The pump laser 267 and the EPR source 268 cooperate, at a request of the quantum controller 264, to generate at least one quantum entangled pair of photons. According to the illustrative example, a first entangled pair includes a first entangled photon 270a and a second entangled photon 270b. Likewise, a second entangled pair of photons includes a first entangled photon 271a and a second entangled photon 271b.

The qubit source 265 can be configured to generate single photons or single entangled photon pairs. Alternatively or in addition, the qubit source 265 can be configured to generate groups of photons to obtain groups of photon pairs. Timing can be important in quantum applications, e.g., quantum teleportation, Bell state measurements, and the like, such that Bell state measurements can be performed on members of the same entangled pair or group of entangled qubits. Timing can be managed in one or more ways. For example, pulsed sources can send out photons in discrete bunches. For at least some applications, such as entanglement swapping, pulsed sources can be synchronized to emit the photon bunches at a precise time. Alternatively or in addition, continuous photon sources can be used to alleviate at least some of the timing requirements. For continuous sources, photons with a proper timing can be obtained not when they are emitted, but when they are later detected, e.g., by separate detectors. A detectors' temporal resolution (the precision of its measurements with respect to time) can allow photons that were emitted at a particular time to be post selected.

In at least some embodiments, the system 250 includes a multiplexer, such as a wavelength division multiplexer (WDM). Example WDMs include coarse WDM (CWDM), e.g., with channel spacing of about 20 nm, and dense WDM (DWDM), e.g., with a finer channel spacing. Data signals, e.g., entangled photons generated according to different wavelengths, can be combined together into a multi-wavelength optical signal using such an optical multiplexer, for transmission over a single fiber. Accordingly, a single optical fiber can be adapted to simultaneously support multiple quantum channel, each operating at a different wavelength. If the first entangled pair of photons 270a, 270b, generally 270, is generated according to a first wavelength and the second entangled pair of photons 271a, 271b, generally 271 is generated according to a second wavelength different from the first, then both pair 270, 271 may be distributed simultaneously along the same quantum channel or fiber, according to an optical multiplexing of the WDM 269.

The first communication node 251 includes a first quantum enabled node (QEN) 272a. Likewise, the second and third communication nodes 252, 254 include respective QENs 272c, 272e. Other communication nodes, such as may be contained in the core cloud 253 and/or in one or more point-of-presence (POP) optical nodes 276, also include QENs 272b, 272c, 272e. According to the illustrative embodiment, the POP optical node 276 can include more than one QEN 272b, 272d, to support multiple quantum channels simultaneously. It is understood that in at least some embodiments, the POP optical node 276 can include a WDM (not shown) to facilitate simultaneous quantum channels along a common fiber, operating at different wavelengths.

Each of the QENs 272a, 272b, 272c, 272d, 272e, 272f, generally 272, is associated with a respective quantum agent (QA) 273a, 273b, 273c, 273d, 273e, 273f, generally 273. The QAs 273 are adapted to implement functionality that supports distribution and/or applications involving quantum entanglement, such as entanglement distribution, qubit measurements, qubit storage, quantum teleportation, quantum encryption, quantum computing, and the like. Accordingly, the QAs 273 are in communication with their respective QENs 272. In at least some embodiments, one or more of the QAs 273 are in further communication with one or more of the quantum controller 264, the quantum control network 266, the qubit source 265 and/or one or more other QAs 273. Communications between the QAs 273 and one or more of the other elements 264, 265, 266, 273 can be accomplished via classical communication channels, e.g., using available communication resources, such as those present in the communication nodes 251, 252, 254. According to the illustrative example, one or more of the communication nodes 251, 252, 254 are in communication via a network 275, such as a backhaul network of a mobile carrier service, e.g., a 5G service, a fiber ring, the Internet, or any other public and/or private network alone or in combination.

The quantum entanglement distribution system 250 establishes quantum entanglement distribution for a quantum channel. Like any other network, such as IP network, one or more of the QA nodes 273, the QENs 272 and the EPR node 265 can be pre-provisioned with pre-built logic, including the entanglement distribution tables. In general, for quantum communication applications, two channels are provided between the source and the destination: a quantum link, or quantum channel, and a classical link or classical channel. The quantum channel is adapted to transport entangled photons according to a predetermined destination and along a determined path, without disturbing the quantum information of the transported particles, e.g., photons.

Described below is an example message flow for the illustrative quantum entanglement distribution system 250. Upon receiving an incoming connection request at the first communication node 251, e.g., from a radio interface of the RAN of an RF site 259, a QA 273a associated with the communication node 251 determines that a quantum connection is required for associated traffic with a remote node, e.g., the POP node 276. Based on a pre-determined logic and/or policy, the first QA 273a notifies a default master EPR source node 265 that a qubits generation is required, and that the an entanglement distribution of the entangled qubits is required between a source QEN 202a of the first communication node 251 and a destination QEN of the destination node 276. The EPR node 265 generates the entangled qubits 271a, 271b and sends a qubit 271a of the entangled qubits 271 to the source QEN 272a and a second qubit 272b of the entangled qubit pair 271 to the destination QEN 272b. Although the EPR generation node 265 is illustrated as a separate and independent node, requiring a quantum channel between itself and both endpoint QENs 272a, 272b, it is understood that in at least some embodiments, the EPR generation node 265 can be collocated with the QEN 272a of the source communication node 251. For example, in an initial deployment of this feature, e.g., with a limited number of possible quantum channels or links, such a collocated source can be used in an effort to keep the cost and/or complexity down.

Now the entangled link (that is quantum channel) has been established between the source QEN and the destination QEN. The classical channel could be using the same path or any other path and this could be business as usual. The destination QEN will wait for the data (quantum state status) from the source QEN via the classical channel.

The illustrative architecture of the example quantum entanglement distribution system 250 can be employed in a fiber optic network, such as a, so-called, deep fiber optical network architecture that extends from a centralized network, such as a mobile carrier backbone network, proximate to one or more wireless access points, e.g., to residences, office buildings, public facilities, such as airports, parks, and government buildings, commercial facilities, such as stores, shopping centers and the like, schools and other educational institutions, and so on, for entanglement distribution. For applications including free space optical channels, it is envisioned that the deep-fiber concept can be extend to untethered access points, such as vehicles, e.g., airplanes, trains, ships, trucking, automobiles, satellites, and the like.

According to the present disclosure, a typical telecommunication infrastructure by employing a local QA in each QEN, e.g., off of the (metropolitan) optical fiber network, that manages the interaction with a single source of EPR (qubits generation) node in order to create entangled link between source and destination nodes. Based on the instruction of the QA of the source quantum enabled node, EPR source node creates the entangled qubits (photons) and distributes them among the two quantum enabled remotes nodes interfacing with the fiber ring (such as the deep fiber supporting a RAN (5G). The architecture allows simultaneous transmission of classical and quantum signals for the classical and quantum channels respectively in the fiber network and provides a local QA enabled simple routing mechanism to serve the entire deep fiber vicinity.

Figure 2G:
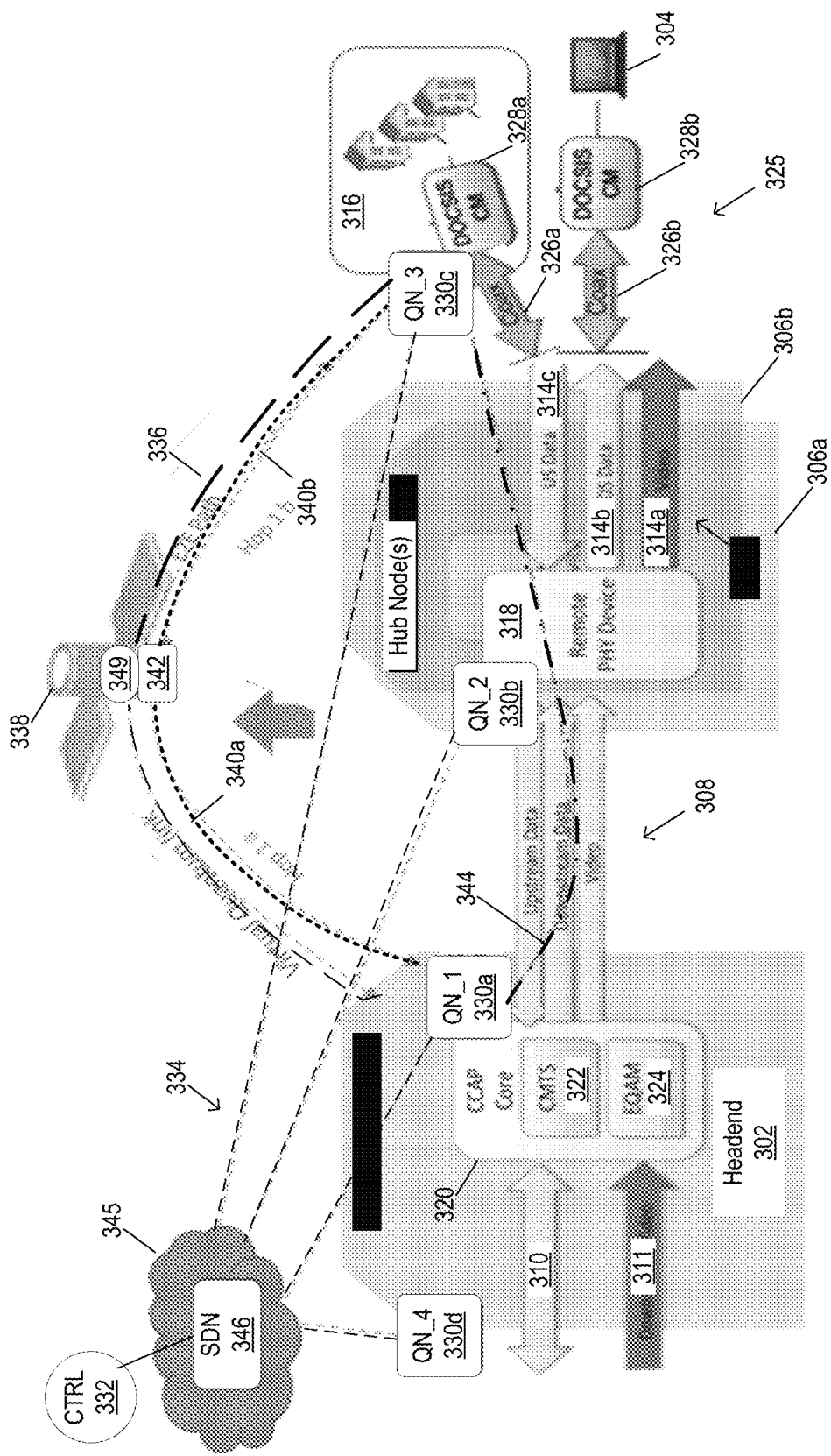
FIG. 2G is a block diagram illustrating an example, non-limiting embodiment of yet another quantum entanglement distribution system functioning within the communication network of FIG. 1 in accordance with various aspects described herein.

FIG. 2G is a block diagram illustrating an example, non-limiting embodiment of a communication network 300 including a quantum entanglement distribution system in accordance with various aspects described herein. The example communication network 300 operates in a service provider-subscriber scenario, providing communication connectivity between service provider resources, e.g., a cable headend 302 and end-user devices 304. End-user devices can include, without limitation, network-enabled premises equipment, such as mobile devices, home theater devices, e.g., smart TVs, computers, gaming systems, residential gateways, LANs, and appliances, such as motion sensors, lighting, security systems, heating/air conditioning, garage door openers, and the like. Media content, such as multicast and/or broadcast content and/or data can be provided via one or more first communication links 308 from a centralized cable headend 302 to one or more regional and/or local nodes, such as the example hub nodes 306a, 306b, generally 306.

Example media content can include broadcast media, such as pre-programmed television channels, cable television line-ups, and/or streaming media, including video and/or audio. For example, media content, such as video channels, network TV channels, gaming content, immersive video, e.g., augmented reality and/or virtual reality, and the like can be received at the cable headend 302 via one or more downstream links 310, 311. Cable lineups and the like can be assembled, e.g., combining content obtained at the headend from different downstream links 310, 311 and in at least some instances, inserting or otherwise integrating supplemental content, such as commercial advertisements. By way of example, the second communication link 312 can include a first portion that transports downstream video content 314a, a second portion that transports downstream data 314b, e.g., traffic destined for a cable modem from the Internet, and a third portion that transports upstream data 314c, e.g., traffic destined for the Internet from cable modems, the upstream traffic originating at customer premises 316 and/or end-user devices 304.

The example headend 302 includes converged-cable-access-platform (CCAP) core 320, adapted to assemble media content for distribution to the one or more hub nodes 306, which in turn can modify the received content, e.g., inserting local programming, such as local television and/or cable channels, local advertisements, and the like, before distribution to subscriber equipment, e.g., the end-user devices 304 via one or more second communication links 312. The example CCAP core 320 includes a cable modem termination system (CMTS) 322, which provides high-speed data services, such as cable Internet or Voice over Internet Protocol (VoIP), to cable subscribers. In some embodiments, the CMTS 322 one or more of an Ethernet interface, a high-speed data interface, e.g., SONET, or an RF interface, e.g., to communicate with subscriber cable modems via the cable company's hybrid fiber coax (HFC) system 325. Traffic coming from an upstream source, e.g., via an Internet connection at the headend 302, can be routed (and/or bridged) through an Ethernet interface of the CMTS 322 and then onto one or more fiber and/or RF interfaces that are connected to the HFC system 325. The example CCAP core 320 further includes an edge QAM (EQAM) 324 as an example physical-layer (PHY) downstream component supporting digital television or cable channels. The CCAP core 320 can communication with remote physical-layer (PHY) equipment 318 at the one or more hub nodes 306 via the one or more first communication links 308, which can include downstream video, downstream data and/or upstream data, e.g., according to Layer 2 protocols, such as Ethernet links, L2TPv3 tunnels, high-speed data interfaces, such as SONET, RF interfaces, and the like.

The hub-node physical-layer equipment 318 can communicate with downstream equipment, such as one or more of cable modems, channel equipment, residential gateways, other hub nodes, end-user devices, and so on. According to the example system, the hub-node, physical-layer equipment 318 communicates with the downstream equipment and/or devices via a hybrid fiber-coaxial (HFC) infrastructure 325, using coaxial cable links 326a, 326b, generally 326, fiber links, or a combination thereof. Data exchange over the HFC infrastructure 325 can terminate at one or more customer premises cable modems 328a, 328b, generally 328. According to the illustrative example, the cable modems operate according to a Data Over Cable Service Interface Specification (DOCSIS), e.g., versions 1.0 through 4.0—an international telecommunications standard that permits the addition of high-bandwidth data transfer to an existing cable television system.

The example communication network 300 also includes quantum enabled elements adapted to establish and/or otherwise support an exchange and/or processing of information according to manipulations and/or measurements of quantum states of objects. According to the illustrative embodiments provide herein, and without limitation, the objects can include photons, and the quantum states of the photons can include one or more of polarization, spin, or orbital angular momentum. As disclosed herein, pairs of photons, or more generally groups of photons, can be generated and/or otherwise manipulated into an entangled state in which a measurement performed upon one member of the entangled group induces an immediate effect on other members of the group, regardless of their physical separation. The example network 300 includes one or more quantum enabled modules or nodes that are adapted to perform one or more of generation of entangled objects, transmission and/or reception of entangled objects, measurements associated with quantum states of the entangled objects, storage of the entangled objects, processing of the entangled objects, e.g., according to quantum logical gates, and the like.

According to the illustrative example, the CCAP core 320 of the headend 302 includes, and/or is associated with, a first quantum enabled node (QN_1) 330a, the physical-layer equipment 318 of the hub node 306a includes, and/or is associated with, a second quantum enabled node (QN_2) 330b, the cable modem 328a includes, and/or is associated with, a third quantum enabled node (QN_3) 330c and the headend itself includes, and/or is associated with, a fourth quantum enabled node (QN_4) 330d. Each of the quantum enabled nodes 330a-330d, generally 330, is in communication with one or more other devices, such as one or more of the other quantum enabled nodes 330. Communications between quantum enabled nodes can be supported by one or more quantum links or channels adapted for transporting one or more quantum entangled objects. The quantum links or channels can be selected, configure and/or otherwise established, such that transportation of quantum entangled objects over the quantum links or channels can be accomplished without destroying or otherwise disturbing quantum entanglement of the transported object. For applications in which the objects are photons, the quantum channels can include optical fiber and/or free-space links or channels.

In addition to the quantum links or channels involving quantum enabled nodes 330, the network 300 also provides one or more classical, or traditional communication channels, such that each of the quantum enabled nodes 330 can be in simultaneous, or overlapping, communication with one or more other devices, e.g., other quantum enabled nodes 330, via a quantum channel and a classical channel. In some embodiments, the quantum channel is physically separate and distinct from the classical communication channel. Alternatively or in addition, one portion of the quantum channel can be separate, while another portion can share a physical transport means supporting the classical channel. In at least some embodiments, the quantum channel and the classical communication channel can be supported by the same physical transport means, e.g., optical fiber and/or free space.

The classical communication channel is adapted to share information related to one or more of a quantum state of a quantum entangled object, a measurement performed upon the quantum entangled object, or more generally, any information related to the quantum entangled object; whereas, the quantum channel supports transport of a quantum entangled object. At least some quantum services, such as quantum teleportation, rely upon both a transportation of the entangled object via the quantum channel and a sharing of entanglement information coincident with the established entanglement between nodes. It is understood that if either of the quantum or classical channels are compromised, success of the quantum operation, e.g., quantum teleportation, can be jeopardized.

In at least some embodiments, the network 300 includes a quantum service controller 332 adapted to facilitate establishment of one or more of the quantum channel or the classical channel in support of a quantum operation. The quantum service controller 332 can be in communication with a signaling network 334 in communication with the one or more quantum enabled nodes 330. The quantum service controller 332 can be configured with network information, including information related to the quantum enabled nodes 330, such as one or more of their identities, e.g., network addresses, their locations, accessible supporting communication infrastructure, e.g., optical fibers, WDMs, add/drop multiplexers, free space optical channels, related operating wavelengths, power levels, owners, operators, their proximity to other systems or devices, such as to the headend 301, the CCPA core 320, the hub node 306a and/or the residential cable modem 328a. Other information can include current utilization data, such as quantum entanglement participation and/or status of individual quantum enable nodes 330 and/or groups of nodes 330, existing and/or previously used quantum channels, performance data, such as present and/or past success rates and/or failure rates, e.g., error rates, signal to noise ratios, congestion, capacity, cable and/or free space attenuation, dispersion, interference, and the like. Alternatively or in addition, the information can include a quantum service provider identifier, applicable cost and/or rates, and so on.

The quantum service controller 332 can be adapted to respond to request for quantum services, by facilitating a provisioning and/or configuration of supporting infrastructure, such as activation and/or engagement of quantum enabled nodes 330, identification and/or establishment of switching and/or routing paths, and the like. In at least some embodiments, it is envisioned that more than one quantum channel may be available or otherwise configurable between two or more quantum enable nodes 330. For example, a first quantum channel may be supportable between two quantum enabled nodes 330 via existing fiber optic infrastructure, e.g., a fiber ring of a metropolitan fiber network and/or a fiber channel of the HFC infrastructure 325. Alternatively or in addition, a second quantum channel may be supportable between the same two quantum enabled nodes 330 via a free space infrastructure, such as a free space terrestrial communication infrastructure and/or free space satellite communication infrastructure.

The quantum service controller 332 can be configured to implement logic and/or policies adapted to identify one or more quantum channels for supporting a quantum service, e.g., quantum teleportation, between at least two quantum enabled nodes 330, e.g., a source node and a destination node. In at least some embodiments, identification of the quantum channels can include identification of more than one available quantum channels between the source and destination. The more than one available quantum channels can include different network paths, e.g., different routes. The different network paths or routes can include the same type of infrastructure, e.g., fiber optic networks. For example, a first route may include a single fiber optic link between the source and destination, e.g., without a repeater, whereas, a second route may include a quantum repeater. Alternatively or in addition, the different network paths or routes can include different types of infrastructures. For example, a first route may include a fiber optic link between the source and destination, whereas, a second route may include a free space optical link, such as a satellite link.

One of the more than one available channels can be selected by the controller 332 based upon selection criteria. It is understood that the different paths may include different path lengths, power levels, interference, utilization, policy restrictions, e.g., being reserved for certain classes of communications and/or using entities, e.g., subscribers. Selection criteria can include, without limitation, performance criteria, such as path loss, path distance, routing and/or switching configuration, e.g., numbers and/or types of switched paths and/or routed segments. It is understood that physical constraints generally limit propagation distances to a maximum distance, beyond which reliable transport of quantum entangled objects, e.g., photons, cannot be assured. If the separation distance, e.g., fiber optical cable distance, between the source and destination exceeds such a maximum distance, network path including at least one repeater may be necessary. Alternatively or in addition, selection criteria can include applicable service level agreements (SLA), quality of service (QoS) requirements and/or measurements, cost, e.g., metered rates, lease rates, access rates, communication service providers, data sensitivity, security requirements, user preferences, subscription levels, and so on.

According to the illustrative example, the controller 332 selects and/or configures a quantum channel 336 between the first quantum enabled node QN_1 330a located at the headend 302 and the third quantum enabled node QN_3 330c located at the subscriber end of the HFC infrastructure or network 325, e.g., at the cable modem 328a. The quantum channel 336 is established via an intermediate node, in this instance, a satellite 338. Accordingly, the quantum channel 336 includes a first satellite link segment or hop 340a between the first quantum enabled node QN_1 330a and the satellite 338 and a second satellite link segment or hop 340b between the satellite 338 and the third quantum enabled node QN_3 330c. In at least some embodiments, the satellite 338 can include a quantum repeater 342. The quantum repeater 342 can be configured to perform an entanglement swapping operation or service, e.g., in which another group of quantum entangled objects, such as another pair of entangled photons, is introduced to extend quantum entanglement between the end nodes 330a, 330c.

In some embodiments, the satellite 338 includes a directional control that permits the satellite 338 to aim a beam of quantum entangled particles towards one or more selected nodes 330a, 330c of a land network, such as the example HFC network 325. In some embodiments, the satellite 338 can include one or more free space quantum transmitters 349, with each being capable of being independently directed, e.g., aimed, to provide a beam of quantum particles to different ones of the nodes 330a, 330c. For example, the free space quantum transmitter 349 can distribute encryption key symbols to one or more land network nodes 330 via a free space link. It is understood that the satellite 338 may include a processing unit, a memory, an input device, an output device, a free space quantum transmitter 349, an RF transceiver and a bus. Although a satellite is disclosed as a quantum repeater node, it is envisioned that other devices, such as other terrestrial nodes can provide a quantum repeater function alone or in combination with the satellite 338.

The free-space quantum transmitter 349 may include a quantum source, a quantum modulator and an optional quantum beam directional control unit. The quantum source may emit quantum particles, such as, for example, photons. In at least some embodiments, the quantum source may include a photon source such as, for example, a laser. The quantum modulator can modulate a state of each quantum particle emitted by quantum source to encode each quantum particle with information, such as an encryption key symbol value. In at least some embodiments, the quantum modulator can modulate a phase and/or polarization and/or energy of emitted photons. For example, the quantum modulator may include a Mach-Zehnder interferometer that may modulate the phase of emitted photons to encode each photon with a symbol value, e.g., an encryption key value.

In at least some embodiments, such an extended range quantum entanglement architecture can be configured according to nested entanglement swapping. For example, an extended range quantum entanglement link or channel can be configured or otherwise established by combining, joining, interconnecting, and/or otherwise splicing together shorter-distance quantum links. The shorter links can be adapted to transport quantum entangled objects, e.g., photons, resulting in an overall longer-distance entanglement. This facilitates quantum entanglement between nodes separated by distances beyond that which would otherwise be achievable using a simple, point-to-point link. Such longer distance links can be accomplished with "n" steps for "2n" hops of comparable quality.

Information based on a quantum state of a quantum entangled pair of photons shared via the quantum channel 336 is likewise shared according to a classical communication channel. According to the illustrative example, a classical communication channel 344 is established between the source and destination nodes 330a, 330c via the first communication links 308 between the centralized cable headend 302 and the hub node 306, and via the HFC network 325. The controller 332 can be adapted to select and/or configure the classical communication channel 344. For example, in some embodiments, the controller 332 can apply similar logic and/or policies to identify, establish or otherwise configure the classical channel 334. Alternatively or in addition, the controller 332 can apply different logic and/or policies to identify, establish or otherwise configure the classical channel 334. For example, classical channels might not be constrained by a maximum photon decay length, as amplification can be applied without concern as to maintaining quantum entanglement of photons used in the classical channel.

The process of entanglement swapping, can be considered as a splicing together of two relatively short-distance entangled pairs of photons, e.g., Bell pairs, into one longer-distance Bell pair. Quantum swapping can be considered as a form of teleportation, e.g., it can be viewed as using a first Bell pair established between the first quantum enabled node QN_1 330a and the satellite 338, via the first hop 340a, to teleport quantum information, e.g., a qubit to the third quantum enabled node QN_3 330c. Related information can be exchanged between the two ends 330a, 330c of the quantum channel 336 and/or between either or both ends 330a, 330c and the satellite 338 via a traditional or classical channel. Accordingly, each quantum entanglement swapping operation step can increase, e.g., double, the span of or a single entangled Bell pair.

Continuing with the illustrative example, a first message is received at the headend 203, e.g., at the CCAP core 320. The message may be received via the CMTS 322, via the EQAM 324, and/or via any other means at the headend 320. In some examples, the message might originate at the headend 302, e.g., from a local operation and/or maintenance system and/or terminal. Upon receiving the message, the first quantum enabled node QN_1 330a can performs table lookup, e.g., according to a native table pre-populated by a software defined network (SDN) 346. Depending upon results of the table lookup, the quantum enabled node QN_1 330a initiates a quantum entanglement path selection. In at least some embodiments, the quantum enabled node QN_1 330a generates quantum entangled group of objects, e.g., a Bell pair. After generating the Bell pair, the satellite 338 is contacted in anticipation of its participation in a quantum channel. For example, a message, e.g., a request and/or a configuration message, can be sent to the satellite 338 providing notification that a quantum entanglement swapping operation will be required. In at least some embodiments, the message identifies one or more of a source quantum enabled node and a destination quantum enabled node. It is understood that in at least some applications, the quantum channel is bi-directional, such that quantum entanglement swapping can be performed according to Bell pairs originating at either, or both nodes.

In response to the request, the satellite 338 establishes a quantum connection with the second quantum enabled node QN_3 330c, e.g., using a Bell pair. In at least some embodiments, the Bell pair can be generated at the satellite 338. Having access to the entanglement swapping is performed at s (satellite) to establish E2E virtual Quantum link between QN1 and QN2.

In at least some embodiments, the system 300 includes a software defined network (SDN) architecture 345. According to at least some embodiments of an SDN architecture 345, a control plane of the network 300 can be separate from a data forwarding plane, so as to control underlying hardware in a programmable manner, e.g., by using a software platform on a centralized SDN controller 346 that controls or orchestrates a commissioning, a decommissioning and/or a distribution of network resources in a responsive manner according to requirements.

According to the SDN network architecture 345, a network device may only be responsible for data forwarding, for example, using commodity hardware. An operating system that is originally responsible for control can be promoted to an independent network operating system, and is responsible for adapting to different service features.

Alternatively or addition, communication among the network operating system, one or more of a service feature or a hardware device can be implemented through programming.

In at least some embodiments, a forwarding plane includes a controlled forwarding device, and a control application that controls forwarding manner and service logic that run on the control plane separated from the forwarding plane. In some embodiments, the SDN architecture 345 can provide an open programmable interface for the control plane. This allows the control application to focus on logic of the control application, without necessarily having to focus on more underlying implementation details. The SDN controller 346 can implement a logically centralized control plane that can control one or more forwarding plane devices that can, in at least some instances, control an entire physical network, so that a global network status view can be obtained, and optimized control can be implemented for the network based on the global network status view.

In at least some embodiments, the control unit 346 can orchestrate data plane resources, e.g., maintaining a network topology and status information, and the like. In at least some embodiments, the control unite 346 can be responsible for data processing and forwarding and status collection based on a flow table. According to SDN techniques, the SDN architecture 346 can provide device resource virtualization and/or programmable commodity hardware and software. The supporting SDN hardware can focus on forwarding and storage capabilities, e.g., including quantum services, allowing the particular devices to be decoupled from a service feature. In the SDN architecture 345, intelligence of at least the quantum enabled services of the network 300 can be implemented by software, e.g., quantum agents, alone or in combination with quantum enabled nodes. The SDN architecture 345 allows the network 300 to respond to a quantum enabled service request more quickly, such that various services can be flexibly added, deleted, and/or customized, so that various network parameters can be customized and configured in the network in real time, and a time for opening a specific service is shortened.

Figure 2H:
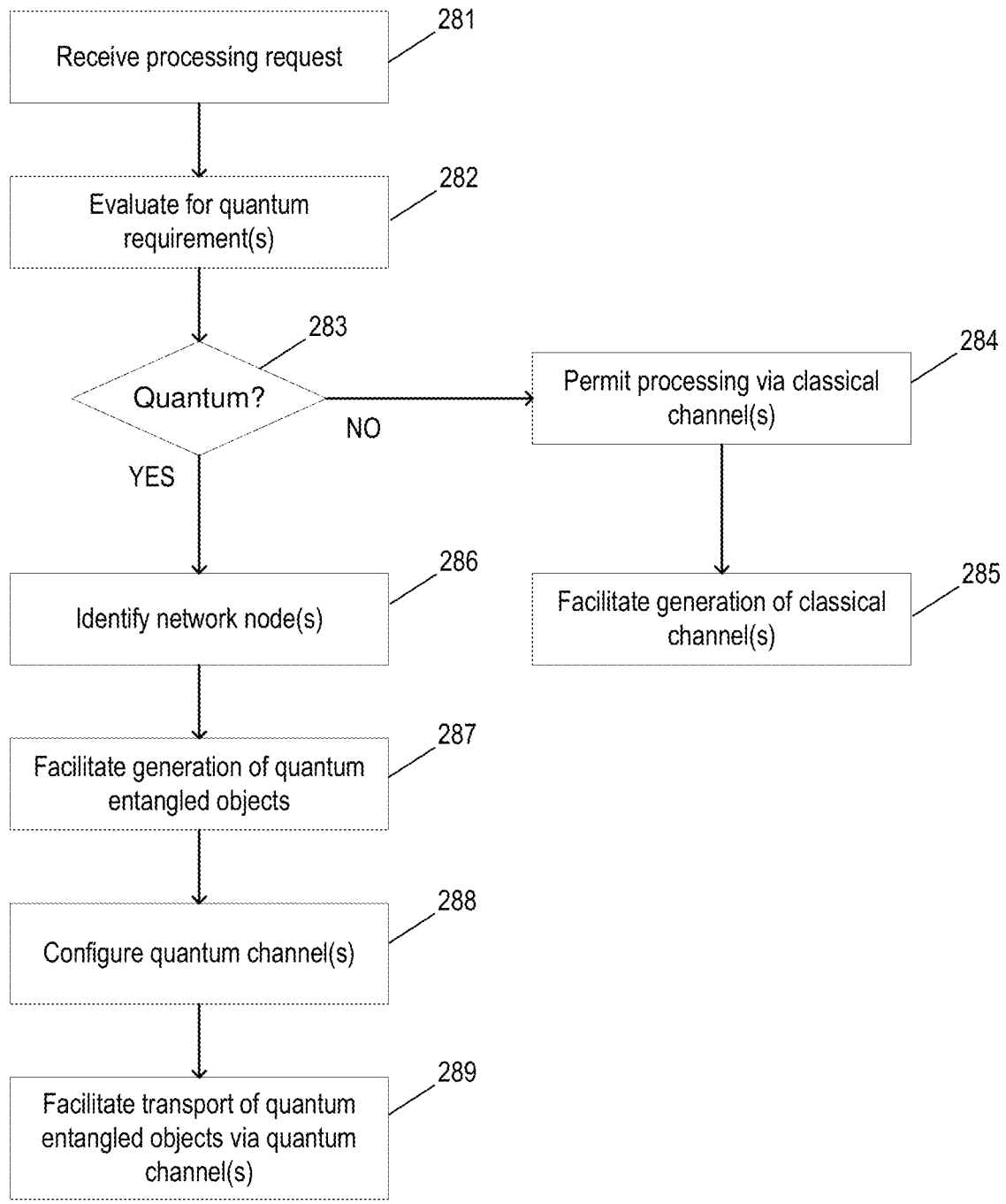
FIG. 2H depicts an illustrative embodiment of a process in accordance with various aspects described herein.

In addition to the SDN architecture 345, a centralized management and control network may be another same or similar network, for example, a transport network, a router network, an access network, or a wireless network that is based on a unified network management and control system. A centralized controller in the embodiments of this application can be an apparatus in the centralized management and control network, for example, may be an SDN controller 346 in the SDN architecture, and/or the quantum service controller 332 and/or or may be a network management server in the HFC network 325, transport network, the router network, the access network, or the wireless network FIG. 2H depicts an illustrative embodiment of a process 280 in accordance with various aspects described herein. A processing request is received at 281. The processing request can be received, e.g., by a QA and or a quantum entanglement controller. The processing request can identify one or more of a source node, e.g., a first communication node of a communication link, a processing node of a processing link, and the like, sometimes referred to herein as a source node. For requests received at a QA of the source node, identification of the source node can be determined by the association of the QA with the source node, e.g., inference. For requests requiring processing on one or more other nodes, the request may identify one or more of the one or more other nodes. For example, a request for communication between a source node and destination node may identify the destination node. For applications in which communications between the source and destination include one or more intermediate nodes, the intermediate nodes may be included or otherwise identified within the request. In at least some embodiments the need and/or identification of intermediate nodes need not be identified within the request, e.g., being determined by another entity, such as the quantum entanglement controller, a quantum network and/or link.

It is understood that in at least some embodiments, the request does not indicate or otherwise identify any requirement for quantum entanglement. In this regard, an evaluation can be performed at 282 to determine whether the request is associated with quantum entanglement requirements. For example, quantum entanglement requirements can depend upon one or more of a source node identity and/or location, a destination node identity and/or location, an information source, e.g., sending user and/or destination, e.g., recipient user, sensitivity of the information to be processed, e.g., communicated, historical information obtained from previous processing requests, the quantity of information to be processed, time sensitivity of the processing, network status, e.g., traffic congestion, message delays, interference, capacity, and so on. In at least some embodiments, the request itself may identify that quantum entanglement is necessary, preferred and/or unnecessary, as the case may be.

A determination is made at 283 as to the existence of any quantum entanglement requirements for the requested connection, e.g., according to the results of the evaluation performed at 282. The evaluation at 282 and/or the determination at 283 can be performed according to pre-configured logic, policies and/or programming at one or more of the QA of the source node, a quantum entanglement controller, or a QA of another node, or in a distributed manner across different QAs and/or one or more QAs and the quantum entanglement controller.

To the extent it is determined at 283 that there are no quantum entanglement requirements, the requested connection is permitted at 284 to proceed via one or more classical communication channels, e.g., telecommunication channels, computer network channels, packet switched networks, circuit switched networks, the Internet, local area networks, public networks private networks, fiber optic networks, such as SONET, cable networks, satellite networks, and the like. Establishment of one or more classical communication channels can be provided at 285. For example, a channel can be requested, configured and/or otherwise identified according to one or more of the source and the destination. In at least some embodiments, selection and/or establishment of a particular classical channel may also depend upon one or more of a source node identity and/or location, a destination node identity and/or location, an information source, e.g., sending user and/or destination, e.g., recipient user, sensitivity of the information to be processed, e.g., communicated, historical information obtained from previous processing requests, the quantity of information to be processed, time sensitivity of the processing, network status, e.g., traffic congestion, message delays, interference, capacity, and so on.

To the extent it is determined at 283 that there do exist quantum entanglement requirements, one or more QENs are identified at 286. For example, a QEN of a processing node adapted to serve the requested processing may include or otherwise be associated with a QEN. Similarly, first and second QENs may be identified according to a source node and a destination node of a requested communication processing. It is envisioned that in at least some instances, one or more intermediate nodes, e.g., between the source and destination nodes, may be required.

In at least some embodiments, identification of the network nodes at 286 can be performed according to pre-configured logic, policies and/or programming at one or more of the QA of the source node, a quantum entanglement controller, or a QA of another node, or in a distributed manner across different QAs and/or one or more QAs and the quantum entanglement controller. For example, a determination of a processing node, such as a destination node of a communication processing request may depend upon the destination node having an associated QA and/or QEN. If an identified destination node is not provided with quantum entanglement capabilities, the request may be denied, and/or altered, e.g., according to the pre-configured logic or policies, to identify a replacement processing node including quantum entanglement capabilities. For example, a replacement node may be selected based upon a physical proximity to the original node. To the extent that intermediate nodes may be required, e.g., quantum repeaters, identification of the network nodes at 286 can be adapted to minimize complexity, e.g., by avoiding and/or minimizing a number of network nodes, e.g., intermediate nodes, that may be required.

Generation of one or more quantum entangled objects is facilitated at 287. Generation of quantum entangled objects can include any process or processes generally known to those skilled in the art, such as the example photon entanglement sources disclosed herein. Other examples of quantum entangled object sources are provide in U.S. patent application Ser. No. 16/426,891, filed on May 30, 2019 and entitled "System and Method for Provisioning of Entangled-Photon Pairs" and Ser. No. 16/211,809, filed on Dec. 6, 2018, and entitled "Free-Space, Twisted Light Optical Communication System." All sections of the aforementioned application(s) and patent(s) are incorporated herein by reference in their entirety.

One or more quantum channels are configured at 287. Quantum channels can include any communication channel or link adapted to transport a quantum entangled object, such as an entangled photon, without destroying or otherwise disturbing the entangled quantum state of a transported quantum entangled object to render it useless. Examples include selection of one or more point-to-point fiber optic links, free-space optical links, e.g., between QENs and/or between one or more QENs and a quantum entanglement source. Alternatively or in addition, configuration can include configuring one or more fiber optic networks, e.g., ring networks, star networks, and/or mesh networks, including any of the examples disclosed herein, equivalents, and the like, e.g., providing switch control and/or signaling commands.

Transport of one or more quantum entangled objects via the one or more configured quantum channels is facilitated at 287. For example, a quantum entanglement source is configured to distribute one entangled object, i.e., entangled photon, of a quantum entangled group of objects to a QEN of a source node, and another entangled object, i.e., photon, of the same quantum entangled group of objects to another QEN of a destination node. For applications involving intermediate nodes, e.g., quantum repeaters, transportation can include providing one or more additional quantum entangled objects to the intermediate node, e.g., repeater to facilitate entanglement swapping to support extension of a quantum enabled state between a source node and a destination node separate by a distance greater than can be physically realized using a single pair of quantum entangled objects, i.e., photons.

Figure 2I:
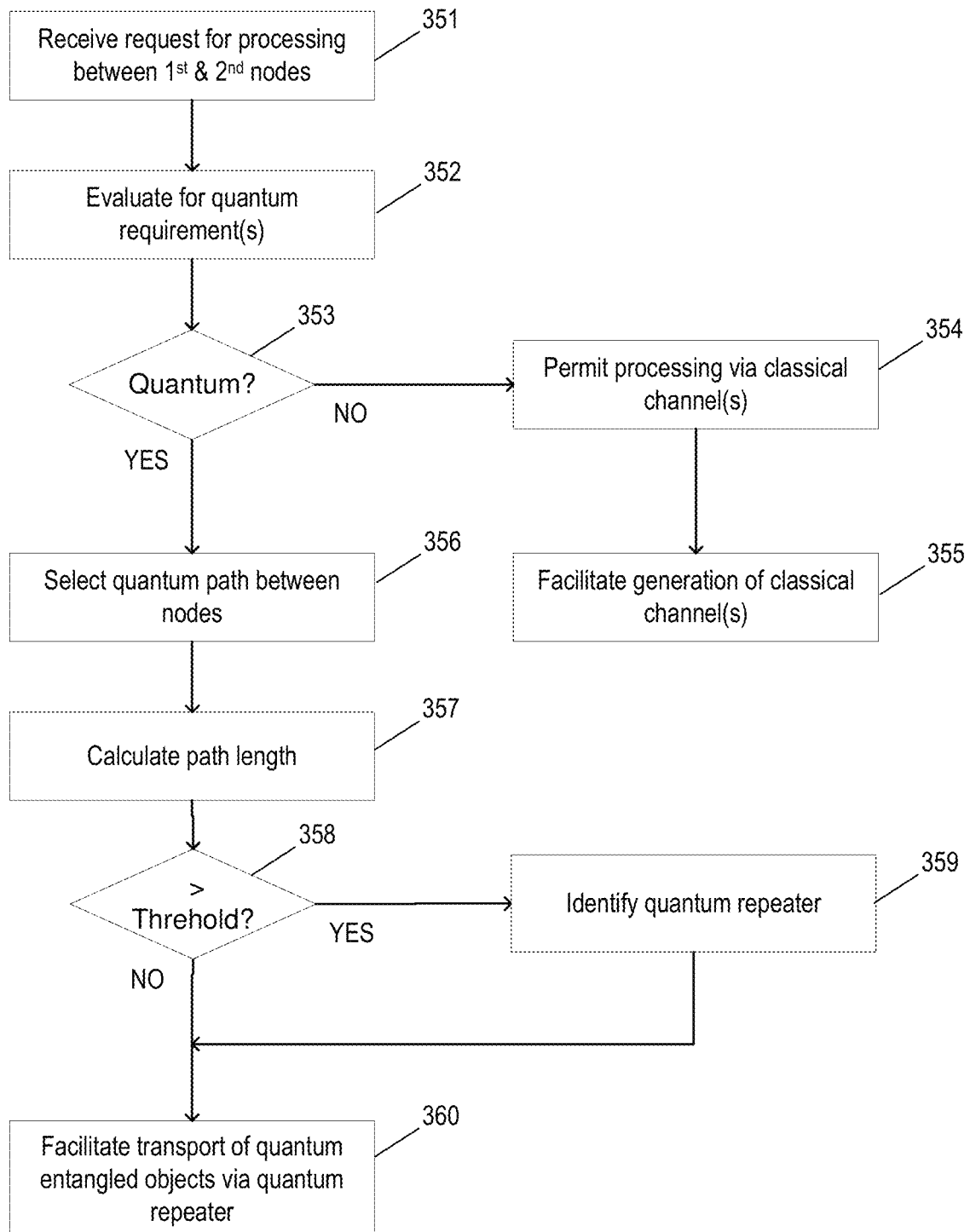
FIG. 2I depicts an illustrative embodiment of another process in accordance with various aspects described herein.

FIG. 2I depicts an illustrative embodiment of a process 350 in accordance with various aspects described herein. A request for processing between two nodes is received at 351. The processing request can be received, e.g., by a QA and or a quantum entanglement controller. The processing request can identify one or more of a source node, e.g., a first communication node of a communication link, a processing node of a processing link, and the like, sometimes referred to herein as a source node. For requests received at a QA of the source node, identification of the source node can be determined by the association of the QA with the source node, e.g., inference. For requests requiring processing on one or more other nodes, the request may identify one or more of the one or more other nodes. For example, a request for communication between a source node and destination node may identify the destination node. For applications in which communications between the source and destination include one or more intermediate nodes, the intermediate nodes may be included or otherwise identified within the request. In at least some embodiments the need and/or identification of intermediate nodes need not be identified within the request, e.g., being determined by another entity, such as the quantum entanglement controller, a quantum network and/or link.

It is understood that in at least some embodiments, the request does not indicate or otherwise identify any requirement for quantum entanglement. In this regard, an evaluation can be performed at 352 to determine whether the request is associated with quantum entanglement requirements. For example, quantum entanglement requirements can depend upon one or more of a source node identity and/or location, a destination node identity and/or location, an information source, e.g., sending user and/or destination, e.g., recipient user, sensitivity of the information to be processed, e.g., communicated, historical information obtained from previous processing requests, the quantity of information to be processed, time sensitivity of the processing, network status, e.g., traffic congestion, message delays, interference, capacity, and so on. In at least some embodiments, the request itself may identify that quantum entanglement is necessary, preferred and/or unnecessary, as the case may be.

A determination is made at 353 as to the existence of any quantum entanglement requirements for the requested connection, e.g., according to the results of the evaluation performed at 352. The evaluation at 352 and/or the determination at 353 can be performed according to pre-configured logic, policies and/or programming at one or more of the QA of the source node, a quantum entanglement controller, or a QA of another node, or in a distributed manner across different QAs and/or one or more QAs and the quantum entanglement controller. One or more of the QAs can be pre-provisioned by the SDN with information, such as the logic, policies, programming, network configurations, node locations, and son.

To the extent it is determined at 353 that there are no quantum entanglement requirements, the requested connection is permitted at 354 to proceed via one or more classical communication channels, e.g., telecommunication channels, computer network channels, packet switched networks, circuit switched networks, the Internet, local area networks, public networks private networks, fiber optic networks, such as SONET, cable networks, satellite networks, an HFC network and the like. Establishment of one or more classical communication channels can be provided at 355. For example, a channel can be requested, configured and/or otherwise identified according to one or more of the source and the destination. In at least some embodiments, selection and/or establishment of a particular classical channel may also depend upon one or more of a source node identity and/or location, a destination node identity and/or location, an information source, e.g., sending user and/or destination, e.g., recipient user, sensitivity of the information to be processed, e.g., communicated, historical information obtained from previous processing requests, the quantity of information to be processed, time sensitivity of the processing, network status, e.g., traffic congestion, message delays, interference, capacity, and so on.

To the extent it is determined at 353 that there do exist quantum entanglement requirements, a quantum path between the nodes is selected at 356. For example, a quantum path may be selected from among multiple available paths. In at least some embodiments, path selection can be performed by and/or performed according to information supplied by the SDN. The selected path may include a source node, a destination node and in at least some instances, one or more intermediate nodes. Nodes can include one or more of communication nodes or quantum enable nodes.

According to the example process, a path length is determined at 357. In at least some embodiments, the path length can be determined by measurements, e.g., transit times, round trip times. Alternatively or in addition the path length can be determined according to information supplied by the SDN.

An evaluation of the path length can be performed to determine whether a repeater may be required. According to the illustrative example, the path length is compared to a path length threshold. The threshold can depend on a type of path, type of path segment and/or combinations of different types of path segments. For example, a path length of an optical fiber segment may depend upon physical properties of one or more of the optical source, the optical detector or the fiber channel. Likewise, a path length of a free-space segment may depend upon physical properties of one or more of the optical source, the optical detector or atmospheric conditions of the free-space link. It is understood that channel conditions may be subject to change for any number of reasons, such as wear of components, atmospheric conditions, interference, congestion, and so on.

To the extent it is determined at 358 that the calculated path length does not exceed the path length threshold, transportation of one or more photons of entangled pairs of photons are transported at 360 via a quantum channel established over the path. To the extent it is determined at 358 that the calculated path length exceeds the path length threshold, a quantum repeater is identified and/or instantiated into the network at 359. Quantum channels can include any communication channel or link adapted to transport a quantum entangled object, such as an entangled photon, without destroying or otherwise disturbing the entangled quantum state of a transported quantum entangled object to render it useless. Examples include selection of one or more point-to-point fiber optic links, free-space optical links, e.g., between QENs and/or between one or more QENs and a quantum entanglement source. Alternatively or in addition, configuration can include configuring one or more fiber optic networks, e.g., ring networks, star networks, and/or mesh networks, including any of the examples disclosed herein, equivalents, and the like, e.g., providing switch control and/or signaling commands.

The disclosed embodiments can enhance security and/or capacity in an HFC network 325 to mitigate and/or eliminate a hacking risk. The quantum service features supported by the various embodiment disclosed herein can present additional revenue streams to network providers, e.g., associated with the provision and/or utilization of quantum services via reliable quantum channels of arbitrary distances. Alternatively or in addition, the techniques disclosed herein can promote or otherwise facilitate a consolidation of operations for different types of quantum services, offering a network provider with one or more of a market differentiator, an ability to offer enhanced reliability, improved QoS on demand, and/or new opportunities for IT service providers as they relate to quantum services over extended, e.g., arbitrary distances.

While for purposes of simplicity of explanation, the respective processes are shown and described as a series of blocks in FIGS. 2H-2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 400 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 210, 220, 230, 240, 250, and 300 presented in FIGS. 1, 2A, 2B, 2C, 2D, 2E, 2F, and 2G and processes 280 and 350, presented in FIGS. 2H and 2I. For example, virtualized communication network 400 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

In particular, a cloud networking architecture is shown that leverages cloud technologies and supports rapid innovation and scalability via a transport layer 450, a virtualized network function cloud 425 and/or one or more cloud computing environments 475. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 430, 432, 434, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 430 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 450 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 430, 432 or 434. These network elements can be included in transport layer 450.

The virtualized network function cloud 425 interfaces with the transport layer 450 to provide the VNEs 430, 432, 434, etc., to provide specific NFVs. In particular, the virtualized network function cloud 425 leverages cloud operations, applications, and architectures to support networking workloads. The virtualized network elements 430, 432 and 434 can employ network function software that provides either a one-for-one mapping of traditional network element function or alternately some combination of network functions designed for cloud computing. For example, VNEs 430, 432 and 434 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 430, 432, 434, etc., can be instantiated and managed using an orchestration approach similar to those used in cloud compute services.

The cloud computing environments 475 can interface with the virtualized network function cloud 425 via APIs that expose functional capabilities of the VNEs 430, 432, 434, etc., to provide the flexible and expanded capabilities to the virtualized network function cloud 425. In particular, network workloads may have applications distributed across the virtualized network function cloud 425 and cloud computing environment 475 and in the commercial cloud, or might simply orchestrate workloads supported entirely in NFV infrastructure from these third party locations.

Figure 4:
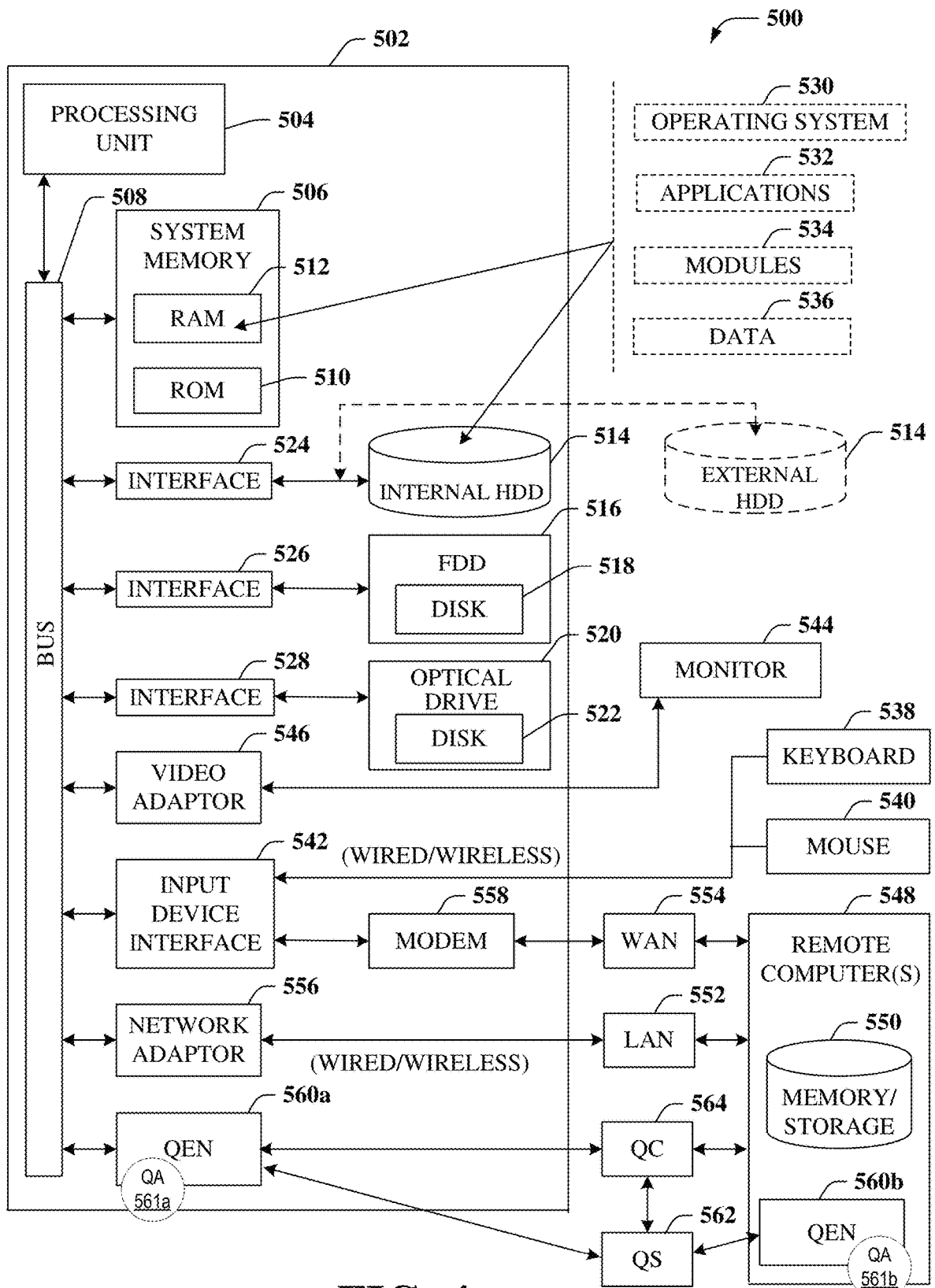
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 500 in which the various embodiments of the subject disclosure can be implemented. In particular, computing environment 500 can be used in the implementation of network elements 150, 152, 154, 156, access terminal 112, base station or access point 122, switching device 132, media terminal 142, and/or VNEs 430, 432, 434, etc. Each of these devices can be implemented via computer-executable instructions that can run on one or more computers, and/or in combination with other program modules and/or as a combination of hardware and software. For example, computing environment 500 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In at least some embodiments, the computing environment 500 is configured to engage and/or otherwise participate in quantum entanglement other computing environments, e.g., remote computers 548, systems and/or network elements to support quantum enabled functions, services and/or applications. For example, the computing 500 includes a quantum source (QS) 562 adapted to generate a quantum entangled group of objects, such as entangled photons, responsive to a request for processing, e.g., communication within the computing environment 500 and/or between the computing environment 500 and other computing environments, systems and/or network elements s, that utilizes quantum entanglement. A first quantum agents (QA) 561a can be included within or otherwise associated with the computer 502, and a second QA 561b can be included within or otherwise associated with the remote computer 548, e.g., to evaluate communication and/or processing requests to determine whether quantum entanglement is desired. Likewise, the computer 502 and/or the remote computer 548 can include one or more quantum enabled nodes (QEN) 560a, 560b, generally 560, that are adapted to transmit, receive, measure, store and/or otherwise process quantum entangled objects according to any of the techniques disclosed herein, including those generally known to those skilled in the art of quantum processing. According to the illustrative embodiments, the computing environment includes at least one quantum controller (QC) 564 adapted to respond to and/or otherwise service requests and/or determinations that quantum processing be implemented in association with the computing environment 500.

In at least some embodiments, each QEN 560a, 560b, generally 560, includes or is otherwise associated with a respective QA 561. That said, it is envisioned that in at least some embodiments, a single QA 561 may be shared with multiple QENs 560, e.g., among a computer 502 and one or more remote computers 548 at a proximate or common location, such as a data center. Having identified quantum entanglements for communications and/or processing between the computer 502, and/or the remote computer 548 and/or other networks and/or systems, one or more quantum channels are identified to support transportation of the entangled objects from an entanglement source to remote destinations to facilitate quantum entanglement between endpoints of the requested link, e.g., according to the various techniques and examples disclosed herein, including the possibility of quantum repeater nodes, if deemed necessary.

Figure 5:
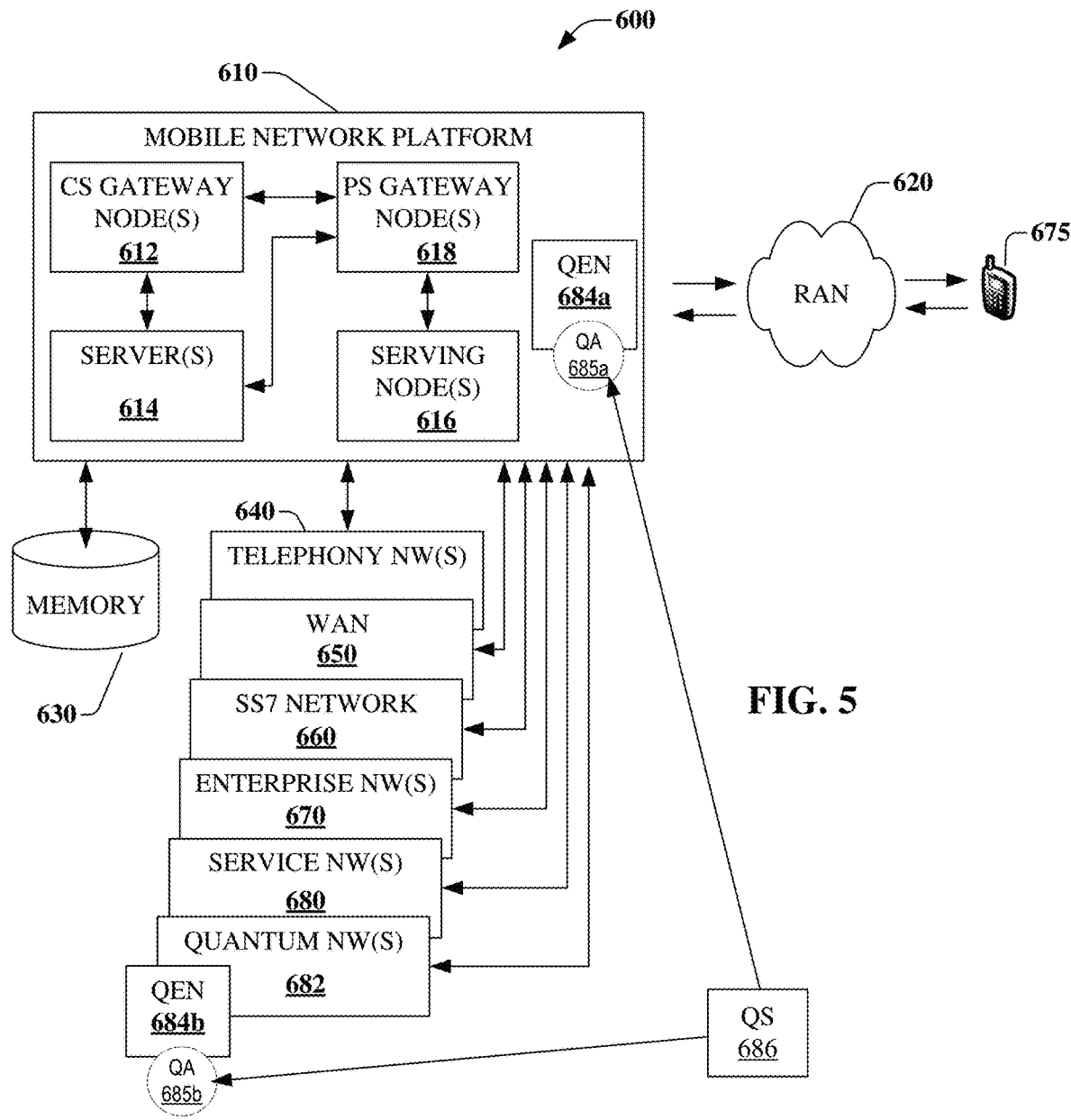
FIG. 5 is a block diagram of an example, non-limiting embodiment of a mobile network platform in accordance with various aspects described herein.

Turning now to FIG. 5, an embodiment 600 of a mobile network platform 610 is shown that is an example of network elements 150, 152, 154, 156, and/or VNEs 430, 432, 434, etc. For example, platform 610 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

In one or more embodiments, the mobile network platform 610 can generate and receive signals transmitted and received by base stations or access points such as base station or access point 122. Generally, mobile network platform 610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 610 can be included in telecommunications carrier networks, and can be considered carrier-side components as discussed elsewhere herein. Mobile network platform 610 comprises CS gateway node(s) 612 which can interface CS traffic received from legacy networks like telephony network(s) 640 (e.g., public switched telephone network (PSTN), or public land mobile network (PLMN)) or a signaling system #7 (SS7) network 660. CS gateway node(s) 612 can authorize and authenticate traffic (e.g., voice) arising from such networks. Additionally, CS gateway node(s) 612 can access mobility, or roaming, data generated through SS7 network 660; for instance, mobility data stored in a visited location register (VLR), which can reside in memory 630. Moreover, CS gateway node(s) 612 interfaces CS-based traffic and signaling and PS gateway node(s) 618. As an example, in a 3GPP UMTS network, CS gateway node(s) 612 can be realized at least in part in gateway GPRS support node(s) (GGSN). It should be appreciated that functionality and specific operation of CS gateway node(s) 612, PS gateway node(s) 618, and serving node(s) 616, is provided and dictated by radio technology(ies) utilized by mobile network platform 610 for telecommunication over a radio access network 620 with other devices, such as a radiotelephone 675.

In addition to receiving and processing CS-switched traffic and signaling, PS gateway node(s) 618 can authorize and authenticate PS-based data sessions with served mobile devices. Data sessions can comprise traffic, or content(s), exchanged with networks external to the mobile network platform 610, like wide area network(s) (WANs) 650, enterprise network(s) 670, and service network(s) 680, which can be embodied in local area network(s) (LANs), can also be interfaced with mobile network platform 610 through PS gateway node(s) 618. It is to be noted that WANs 650 and enterprise network(s) 670 can embody, at least in part, a service network(s) like IP multimedia subsystem (IMS). Based on radio technology layer(s) available in technology resource(s) or radio access network 620, PS gateway node(s) 618 can generate packet data protocol contexts when a data session is established; other data structures that facilitate routing of packetized data also can be generated. To that end, in an aspect, PS gateway node(s) 618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 600, mobile network platform 610 also comprises serving node(s) 616 that, based upon available radio technology layer(s) within technology resource(s) in the radio access network 620, convey the various packetized flows of data streams received through PS gateway node(s) 618. It is to be noted that for technology resource(s) that rely primarily on CS communication, server node(s) can deliver traffic without reliance on PS gateway node(s) 618; for example, server node(s) can embody at least in part a mobile switching center. As an example, in a 3GPP UMTS network, serving node(s) 616 can be embodied in serving GPRS support node(s) (SGSN).

For radio technologies that exploit packetized communication, server(s) 614 in mobile network platform 610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 610. Data streams (e.g., content(s) that are part of a voice call or data session) can be conveyed to PS gateway node(s) 618 for authorization/authentication and initiation of a data session, and to serving node(s) 616 for communication thereafter. In addition to application server, server(s) 614 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 610 to ensure network's operation and data integrity in addition to authorization and authentication procedures that CS gateway node(s) 612 and PS gateway node(s) 618 can enact. Moreover, provisioning server(s) can provision services from external network(s) like networks operated by a disparate service provider; for instance, WAN 650 or Global Positioning System (GPS) network(s) (not shown). Provisioning server(s) can also provision coverage through networks associated to mobile network platform 610 (e.g., deployed and operated by the same service provider), such as the distributed antennas networks shown in FIG. 1(*s*) that enhance wireless service coverage by providing more network coverage.

It is to be noted that server(s) 614 can comprise one or more processors configured to confer at least in part the functionality of mobile network platform 610. To that end, the one or more processor can execute code instructions stored in memory 630, for example. It is should be appreciated that server(s) 614 can comprise a content manager, which operates in substantially the same manner as described hereinbefore.

In example embodiment 600, memory 630 can store information related to operation of mobile network platform 610. Other operational information can comprise provisioning information of mobile devices served through mobile network platform 610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 630 can also store information from at least one of telephony network(s) 640, WAN 650, SS7 network(s) 660, or enterprise network(s) 670. In an aspect, memory 630 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the mobile network platform 610 is configured to engage and/or otherwise participate in quantum entanglement other computing environments, e.g., remote computers, systems and/or other networks, such as quantum networks 682, to support quantum enabled functions, services and/or applications. For example, the mobile network platform 610 includes a quantum source (QS) 684*a* adapted to generate a quantum entangled group of objects, such as entangled photons, responsive to a request for processing, e.g., communication within the mobile network platform 610 and/or between the mobile network platform 610 and other computing environments, systems and/or network 682, that utilizes quantum entanglement. A first quantum agents (QA) 685*a* can be included within or otherwise associated with the mobile network platform 610, and a second QA 685*b* can be included within or otherwise associated with the quantum network 682, e.g., to evaluate communication and/or processing requests to determine whether quantum entanglement is desired. Likewise, the mobile network platform 610 and/or the quantum network 682 can include one or more quantum enabled nodes (QEN) 684*a*, 684*b*, generally 684, that are adapted to transmit, receive, measure, store and/or otherwise process quantum entangled objects according to any of the techniques disclosed herein, including those generally known to those skilled in the art of quantum processing. According to the illustrative embodiments, the mobile network environment 600 includes at least one quantum controller (QC) 686 adapted to respond to and/or otherwise service requests and/or determinations that quantum processing be implemented in association with the mobile network environment 600.

In at least some embodiments, each QEN 684, includes or is otherwise associated with a respective QA 685*a*, 685*b*, generally 685. That said, it is envisioned that in at least some embodiments, a single QA 685 may be shared with multiple QENs 684, e.g., among a mobile network platform 610 and one or more remote quantum networks 682 at a proximate or common location, such as a data center. Having identified quantum entanglements for communications and/or processing between the mobile network platform 610, and/or the remote quantum network 682 and/or other networks and/or systems, one or more quantum channels are identified to support transportation of the entangled objects from an entanglement source to remote destinations to facilitate quantum entanglement between endpoints of the requested link, e.g., according to the various techniques and examples disclosed herein, including the possibility of quantum repeater nodes, if deemed necessary.

Figure 6:
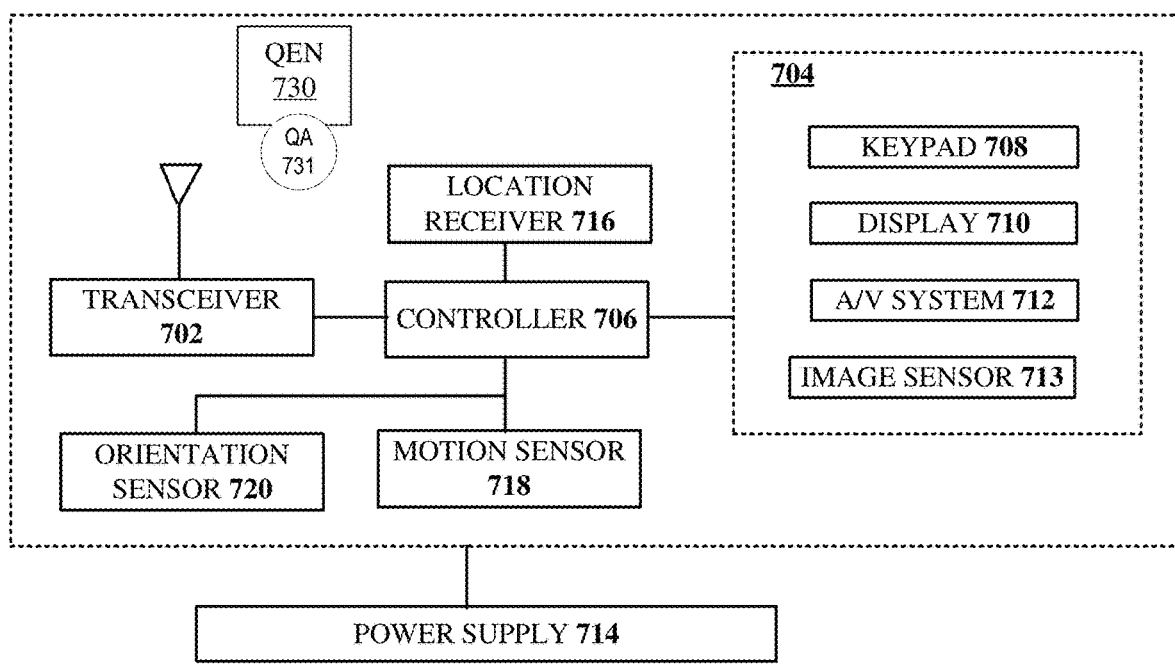
FIG. 6 is a block diagram of an example, non-limiting embodiment of a communication device in accordance with various aspects described herein.

Turning now to FIG. 6, an illustrative embodiment of a communication device 700 is shown. The communication device 700 can serve as an illustrative embodiment of devices such as data terminals 114, mobile devices 124, vehicle 126, display devices 144 or other client devices for communication via either communications network 125. For example, computing device 700 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface having graphical user interface (GUI) elements that can be selected by a user with a touch of a finger. The display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable communications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 6 can be used in one or more embodiments of the subject disclosure. For instance, the communication device 700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In at least some embodiments, the communication device 700 is configured to engage and/or otherwise participate in quantum entanglement other computing environments, e.g., remote computers, systems and/or other networks to support quantum enabled functions, services and/or applications. For example, the communication device 700 includes a quantum agent (QA) 731 that can be included within or otherwise associated with the communication device 700, e.g., to evaluate communication and/or processing requests to determine whether quantum entanglement is desired. Likewise, the communication device 700 can include a quantum enabled node (QEN) 730, adapted to transmit, receive, measure, store and/or otherwise process quantum entangled objects according to any of the techniques disclosed herein, including those generally known to those skilled in the art of quantum processing.

The QEN 730 can be in communication with a quantum source (QS), adapted to generate a quantum entangled group of objects, such as entangled photons, responsive to a request for processing, e.g., communication within the communication device 700 and/or between the communication device 700 and other communication devices, computing environments, systems and/or network, that utilizes quantum entanglement.

Other quantum networking techniques are disclosed in U.S. patent application Ser. No. 16/706329, entitled "System and Method for Network Distribution of Quantum Entanglement," filed on Dec. 6, 2019, all sections thereof are incorporated herein by reference in their entirety.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a processing system including a processor; and
a memory that stores executable instructions that, when executed by the processing system, facilitate performance of operations, the operations comprising:
determining that quantum entanglement be established between a first node and a second node of a service provider network comprising a software defined network (SDN) that facilitates delivery of a service to a service subscriber;
selecting a quantum path between the first node and the second node based on pre-provisioned information supplied by the SDN;
calculating a path length of the quantum path based on the pre-provisioned information supplied by the SDN;
identifying a quantum repeater node responsive to the path length exceeding a threshold, wherein the quantum path comprises a first segment between the first node and the quantum repeater node and having a segment length that does not exceed the threshold; and
facilitating a sharing of a quantum entanglement state between the first node and the second node to obtain a shared quantum entanglement state based on transportation of a first photon of a first entangled pair of photons via the first segment.

2. The system of claim 1, wherein the operations further comprise:
initiating a classical communication channel between the first node and the second node, the classical communication channel adapted to communicate quantum state information of the shared quantum entanglement state from the first node to the second node to obtain communicated quantum state information,
wherein the quantum state information is obtained from a measurement performed upon a second quantum photon of the first entangled pair of photons, and wherein information is exchanged between the first node and the second node via the quantum path according to the transportation of the first photon of the first entangled pair of photons and the communicated quantum state information.

3. The system of claim 2, wherein the quantum state information is shared within a hybrid fiber-coax (HFC) network.

4. The system of claim 3, wherein the quantum state information comprises operational information of the HFC network.

5. The system of claim 4, wherein the operational information of the HFC network comprises a security key.

6. The system of claim 1, wherein the operations further comprise:
determining a first location of the first node and a second location of the second node based on the pre-provisioned information supplied by the SDN; and
identifying a quantum source configured to generate the first entangled pair of photons based on the first location, wherein a first network routing path extends between the quantum source and the first node, the first network routing path adapted to transport a second photon of the first entangled pair of photons to the first node.

7. The system of claim 6, wherein identifying of the first network routing path further comprises:
identifying a second network routing path based on the second location, the second network routing path extending between the quantum source and the quantum repeater node, the second network routing path adapted to transport a second photon of the first entangled pair of photons to the quantum repeater node.

8. The system of claim 7, wherein the first segment comprises a fiber optic link adapted to transport the first photon of the first entangled pair of photons.

9. The system of claim 7, wherein the quantum path comprises a free-space optical link adapted to transport a photon of the first entangled pair of photons.

10. The system of claim 9, wherein the quantum repeater node comprises a satellite repeater node, the free-space optical link extending from a terrestrial location to the satellite repeater node.

11. A method, comprising:
- determining, by a processing system including a processor, that quantum entanglement be established between a first node and a second node of a service provider network comprising a software defined network (SDN) that facilitates delivery of a service to a service subscriber;
- identifying, by the processing system, a path between the first node and the second node based on pre-provisioned information supplied by the SDN;
- determining, by the processing system, a path length of the path based on the pre-provisioned information supplied by the SDN;
- identifying, by the processing system, a repeater node responsive to the path length exceeding a threshold, wherein the path comprises a first segment between the first node and the repeater node having a segment length that does not exceed the threshold; and
- facilitating, by the processing system, a sharing of a quantum entanglement state between the first node and the second node to obtain a shared quantum entanglement state based on transportation of a first photon of a first entangled pair of photons via the first segment.

12. The method of claim 11, further comprising:
- initiating, by the processing system, a classical communication channel between the first node and the second node, the classical communication channel adapted to communicate quantum state information of the shared quantum entanglement state from the first node to the second node to obtain communicated quantum state information,
- wherein the quantum state information is obtained from a measurement performed upon a second quantum photon of the first entangled pair of photons, and wherein information is exchanged between the first node and the second node via the path according to the transportation of the first photon of the first entangled pair of photons and the communicated quantum state information.

13. The method of claim 12, wherein the quantum state information is shared within a hybrid fiber-coax (HFC) network.

14. The method of claim 13, wherein the quantum state information comprises operational information of the HFC network.

15. The method of claim 14, wherein the operational information of the HFC network comprises a security key.

16. The method of claim 11, further comprising:
- determining, by the processing system, a first location of the first node and a second location of the second node based on the pre-provisioned information supplied by the SDN; and
- identifying, by the processing system, a quantum source configured to generate the first entangled pair of photons based on the first location, wherein a first routing path extends between the quantum source and the first node, the first routing path adapted to transport a second photon of the first entangled pair of photons to the first node.

17. A non-transitory, machine-readable medium, comprising executable instructions that, when executed by a processing system including a processor, facilitate performance of operations, the operations comprising:
- determining that quantum entanglement be established between a first node and a second node of a service provider network comprising a software defined network (SDN) that facilitates delivery of a service to a service subscriber;
- identifying a path between the first node and the second node based on pre-provisioned information supplied by the SDN;
- estimating a path length of the path based on the pre-provisioned information supplied by the SDN;
- selecting a quantum repeater node responsive to the path length exceeding a threshold, wherein the path comprises a first segment between the first node and the quantum repeater node having a segment length that does not exceed the threshold; and
- facilitating a sharing of a quantum entanglement state between the first node and the second node to obtain a shared quantum entanglement state based on transportation of a first photon of a first entangled pair of photons via the first segment.

18. The non-transitory, machine-readable medium of claim 17, wherein the operations further comprise:
- initiating a classical communication channel between the first node and the second node, the classical communication channel adapted to communicate quantum state information of the shared quantum entanglement state from the first node to the second node to obtain communicated quantum state information,
- wherein the quantum state information is obtained from a measurement performed upon a second quantum photon of the first entangled pair of photons, and wherein information is exchanged between the first node and the second node via the path according to the transportation of the first photon of the first entangled pair of photons and the communicated quantum state information.

19. The non-transitory, machine-readable medium of claim 18, wherein the quantum state information is shared within a hybrid fiber-coax (HFC) network.

20. The non-transitory, machine-readable medium of claim 19, wherein the operations further comprise:
- determining a first location of the first node and a second location of the second node based on the pre-provisioned information supplied by the SDN; and
- identifying a quantum source configured to generate the first entangled pair of photons based on the first location, wherein a first routing path extends between the quantum source and the first node, the first routing path adapted to transport a second photon of the first entangled pair of photons to the first node.

* * * * *